United States Patent
Yamaguchi et al.

(10) Patent No.: US 11,462,921 B2
(45) Date of Patent: *Oct. 4, 2022

(54) SECONDARY-BATTERY PROTECTION CIRCUIT AND BATTERY PACK

(71) Applicant: MITSUMI ELECTRIC CO., LTD., Tokyo (JP)

(72) Inventors: Takeshi Yamaguchi, Tokyo (JP); Yoshihiro Motoichi, Tokyo (JP); Junji Takeshita, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,403

(22) Filed: May 21, 2021

(65) Prior Publication Data

US 2021/0273463 A1  Sep. 2, 2021

Related U.S. Application Data

(63) Continuation of application No. 16/701,362, filed on Dec. 3, 2019, now Pat. No. 11,018,515.

(30) Foreign Application Priority Data

Dec. 5, 2018 (JP) .................................. 2018-227763

(51) Int. Cl.
*H02J 7/00* (2006.01)
*H02H 7/18* (2006.01)

(52) U.S. Cl.
CPC ............. *H02J 7/0031* (2013.01); *H02H 7/18* (2013.01); *H02J 7/00304* (2020.01); *H02J 7/00306* (2020.01)

(58) Field of Classification Search
CPC .. H02J 7/0029; H02J 7/00304; H02J 7/00306; H02J 7/00308; H02J 7/0031;
(Continued)

(56) References Cited

U.S. PATENT DOCUMENTS 3,389,303 A   6/1968   Tenenbaum
5,896,025 A   4/1999   Yamaguchi et al.
(Continued)

FOREIGN PATENT DOCUMENTS

JP       2012-009339       1/2012

*Primary Examiner* — Yemane Mehari
(74) *Attorney, Agent, or Firm* — IPUSA, PLLC

(57) ABSTRACT

A secondary-battery protection circuit is configured to, in response to detecting that a first switching circuit is turned on and a second switching circuit is turned on, supply a first output voltage to a first load between a first terminal and a second terminal; and supply a third output voltage to a second load between the first terminal and a third terminal, the third output voltage indicating the sum of the first output voltage and a second output voltage, the second output voltage corresponding to a voltage across a second secondary battery. In response to detecting that the first switching circuit is turned off and the second switching circuit is turned on, the secondary-battery protection circuit is configured to stop supplying the first output voltage to the first load; and stop supplying the third output voltage via the first terminal and the third terminal.

16 Claims, 20 Drawing Sheets

(58) Field of Classification Search
CPC ........ H02J 9/002; H02H 7/18; H01M 10/443; H01M 10/486
USPC .......................................... 361/93.1; 320/134
See application file for complete search history.

(56) References Cited

U.S. PATENT DOCUMENTS

| | | | |
|---|---|---|---|
| 8,367,234 B2* | 2/2013 | Goto | ................. H02J 7/007 |
| | | | 429/93 |
| 10,074,875 B2* | 9/2018 | Shibata | ................. H01M 10/44 |
| 10,199,679 B2* | 2/2019 | Abe | ................. H01M 10/425 |
| 10,439,410 B2 | 10/2019 | Wang et al. | |
| 10,516,276 B2* | 12/2019 | Yamauchi | ............. H02J 7/0031 |
| 10,680,429 B2 | 6/2020 | Kim | |
| 2008/0116851 A1 | 5/2008 | Mori | |
| 2010/0090652 A1 | 4/2010 | Takeda et al. | |
| 2011/0156656 A1 | 6/2011 | Saito | |
| 2014/0139176 A1 | 5/2014 | Ji | |
| 2015/0200537 A1 | 7/2015 | Kang et al. | |
| 2018/0013299 A1* | 1/2018 | Abe | ................. H02J 7/0029 |
| 2020/0185937 A1* | 6/2020 | Yamaguchi | ......... H02J 7/00304 |

* cited by examiner

SECONDARY-BATTERY PROTECTION CIRCUIT AND BATTERY PACK

CROSS-REFERENCE TO RELATED APPLICATION

This application is a continuation application of and claims the benefit under 35 U.S.C. § 120 of U.S. patent application Ser. No. 16/701,362, filed Dec. 3, 2019, which claims priority to Japanese Patent Application No. 2018-227763, filed Dec. 5, 2018. The contents of these applications are incorporated herein by reference in their entirety.

BACKGROUND

1. Field of the Invention

The present disclosure relates to a secondary-battery protection circuit and a battery pack.

2. Description of the Related Art

A battery pack has been known to include a protection circuit that stops supplying a voltage across series-connected secondary batteries to a single load when abnormalities in the secondary batteries are detected (e.g., Japanese Unexamined Patent Application Publication No. 2012-9339 that is referred to as Patent document 1).

SUMMARY

The present disclosure provides a secondary-battery protection circuit. A secondary-battery protection circuit for protecting each of series-connected first secondary battery and second secondary battery, includes:
a first terminal;
a second terminal;
a third terminal;
a first switching circuit configured to be disposed in a current path between a negative electrode of the first secondary battery and the first terminal;
a second switching circuit configured to be disposed in a current path between a negative electrode of the second secondary battery and the second terminal or in a current path between a positive electrode of the second secondary battery and the third terminal;
a first protection IC configured to turn off the first switching circuit to protect the first secondary battery against overdischarge or discharge overcurrent;
a second protection IC configured to turn off the second switching circuit to protect the second secondary battery against overdischarge or discharge overcurrent,
wherein the secondary-battery protection circuit is configured to:
in response to detecting that the first switching circuit is turned on by the first protection IC and the second switching circuit is turned on by the second protection IC,
supply a first output voltage to a first load between the first terminal and the second terminal, the first output voltage corresponding to a voltage across the first secondary battery; and
supply a third output voltage to a second load between the first terminal and the third terminal, the third output voltage indicating the sum of the first output voltage and a second output voltage, the second output voltage corresponding to a voltage across the second secondary battery; and in response to detecting that the first switching circuit is turned off by the first protection IC and the second switching circuit is turned on by the second protection IC,
stop supplying the first output voltage to the first load; and
stop supplying the third output voltage via the first terminal and the third terminal; and
interrupt a current flow to the first load and the second load, the current flow being from the second secondary battery, via the first protection IC; and
in response to detecting that the first switching circuit is turned on by the first protection IC and the second switching circuit is turned off by the second protection IC,
supply the first output voltage to the first load; and
stop supplying the third output voltage via the first terminal and the third terminal; and
interrupt a current flow to the first load and the second load, the current flow being from the first secondary battery, via the second protection IC.

The present disclosure provides a secondary-battery protection circuit. The secondary-battery protection circuit includes:
a first output terminal configured to be electrically connected to a negative electrode of a first secondary battery that is electrically connected to a second secondary battery in series;
a second output terminal configured to be electrically connected to a positive electrode of the first secondary battery and a negative electrode of the second secondary battery;
a third output terminal configured to be electrically connected to a positive electrode of the second secondary battery;
a first protection circuit including a first switch in a discharge path, the first protection circuit being configured to protect the first secondary battery against overdischarge or discharge overcurrent, through the first switch;
a second protection circuit including a second switch in a discharge path, the second protection circuit being configured to protect the second secondary battery against overdischarge or discharge overcurrent, through the second switch,
wherein the secondary-battery protection circuit is configured to:
supply a voltage across each of the first secondary battery and the second secondary battery;
supply the sum of a voltage across the first secondary battery and a voltage across the second secondary battery;
in response to detecting that the first switch is turned off by the first protection circuit and the second switch is turned on by the second protection circuit, interrupt a current flow to a first load between the first output terminal and the second output terminal, and the current flow being from the second secondary battery, via the first protection circuit; and
in response to detecting that the second switch is turned off by the second protection circuit and the first switch is turned on by the first protection circuit, interrupt a current flow to a second load between the first output terminal and the third output terminal, and the current flow being from the first secondary battery, via the second protection circuit.

The present disclosure provides a battery pack. The battery pack includes:
a first secondary battery;
a second secondary battery being electrically connected to the first secondary battery in series;
a secondary-battery protection circuit including:
a first terminal;
a second terminal;

a third terminal;
a first switching circuit in a current path between a negative electrode of the first secondary battery and the first terminal, or in a current path between a positive electrode of the first second secondary battery and the second terminal;
a second switching circuit in a current path between a negative electrode of the second secondary battery and the second terminal; or in a current path between a positive electrode of the second secondary battery and the third terminal;
a first protection IC configured to turn off the first switching circuit to protect the first secondary battery against overdischarge or discharge overcurrent;
a second protection IC configured to turn off the second switching circuit to protect the second secondary battery against overdischarge or discharge overcurrent,
wherein the secondary-battery protection circuit is configured to:
in response to detecting that the first switching circuit is turned on by the first protection IC and the second switching circuit is turned on by the second protection IC,
supply a first output voltage to a first load between the first terminal and the second terminal, the first output voltage corresponding to a voltage across the first secondary battery; and
supply a third output voltage to a second load between the first terminal and the third terminal, the third output voltage indicating the sum of the first output voltage and a second output voltage, the second output voltage corresponding to a voltage across the second secondary battery; and
in response to detecting that the first switching circuit is turned off by the first protection IC and the second switching circuit is turned on by the second protection IC,
stop supplying the first output voltage to the first load; and
stop supplying the third output voltage via the first terminal and the third terminal; and
interrupt a current flow to the first load and the second load, the current flow being from the second secondary battery, via the first protection IC; and
in response to detecting that the first switching circuit is turned on by the first protection IC and the second switching circuit is turned off by the second protection IC,
supply the first output voltage to the first load; and
stop supplying the third output voltage via the first terminal and the third terminal; and
interrupt a current flow to the first load and the second load, the current flow being from the first secondary battery, via the second protection IC.

DESCRIPTION OF THE EMBODIMENTS

With respect to related art in which a battery pack supplies one voltage to a given load, the inventors have recognized the following: when two voltages are required by the load, the supplied one voltage is needed to be converted into two voltages on a load side, which results in loss in power conversion on the load side. Accordingly, consumption efficiency of power supplied to the load by the battery pack may decrease.

In light of the issue recognized by the inventors, the present disclosure provides a secondary-battery protection circuit and a battery pack, so as to increase consumption efficiency of power supplied to a load.

One or more embodiments in the present disclosure will be hereinafter described with reference to the drawings. First, for comparison with the embodiments in the present disclosure, a configuration of a battery pack in a comparative example will be described.

Figure 1:
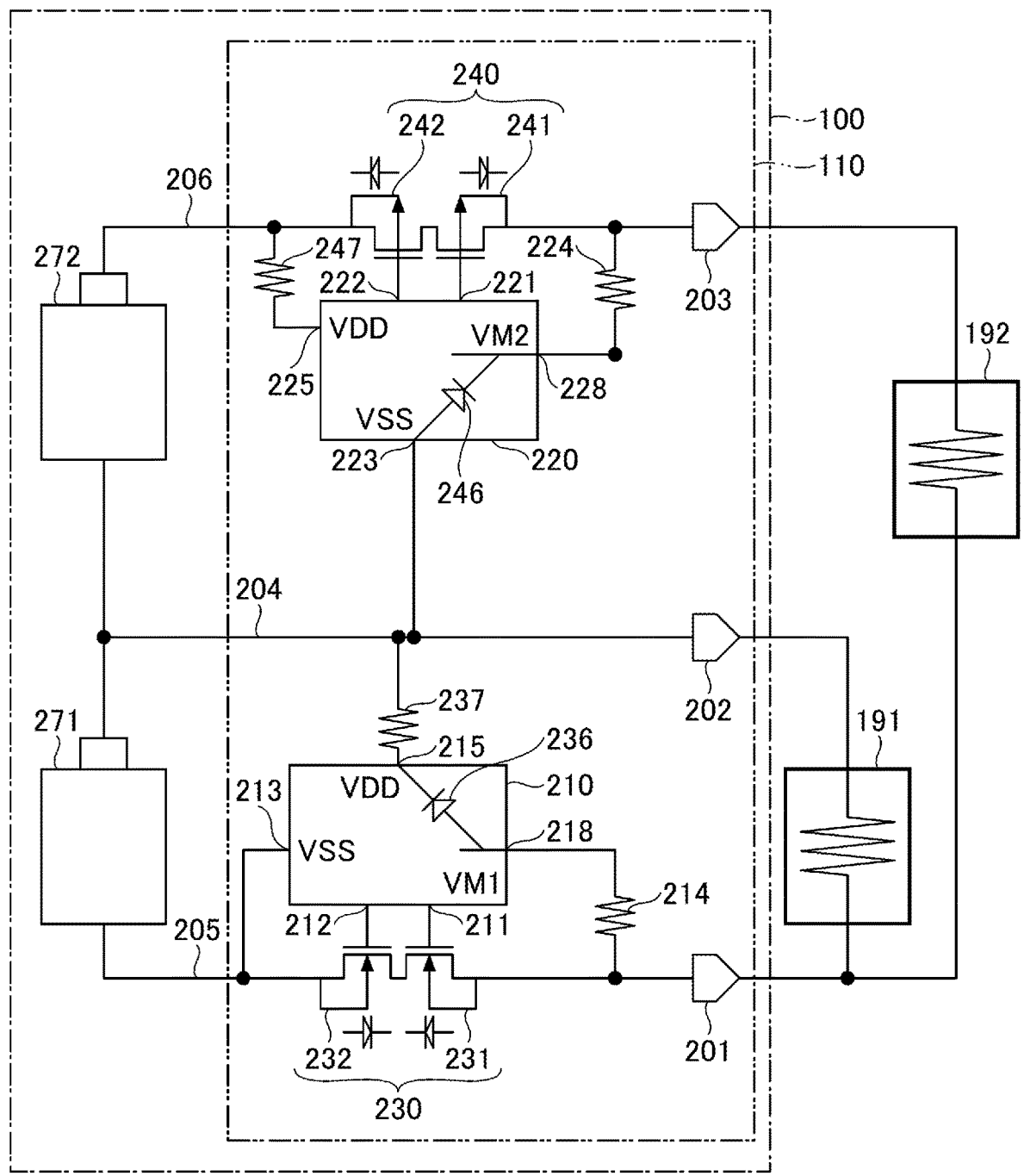
FIG. 1 is a diagram illustrating an example of a configuration of a battery pack in a comparative example.

FIG. 1 is a diagram illustrating an example of a configuration of a battery pack in the comparative example. In FIG. 1, a battery pack 100 includes a first secondary battery 271 and a second secondary battery 272 that are series-connected, and includes a secondary-battery protection circuit 110 that protects each of the first secondary battery 271 and the second secondary battery 272.

In the following description, the first secondary battery 271 and the second secondary battery 272 are also referred to as a first cell 271 and a second cell 272, respectively. The first secondary battery 271 and the second secondary battery 272 are also referred to as cells 271 and 272, respectively.

Cells 271 and 272 are both rechargeable batteries. The first cell 271 supplies power to a first load 191 that is connected to a first terminal 201 and a second terminal 202. The series-connected cells 271 and 272 supply power to a second load 192 that is connected to the first terminal 201 and a third terminal 203. The cells 271 and 272 can be charged by a charger that is not shown and that is connected to the first terminal 201 and the third terminal 203. As specific examples of the cells 271 and 272, lithium ion batteries, lithium polymer batteries, or the like are used.

The secondary-battery protection circuit 110 includes the first terminal 201, the second terminal 202, and the third terminal 203. The secondary-battery protection circuit 110 includes a first switching circuit 230, a second switching circuit 240, a first protection IC 210, and a second protection IC 220.

In a first current path 205 between a negative electrode of the first cell 271 and the first terminal 201, a first switching circuit 230 is inserted. A second current path 204 is connected between the second terminal 202 and a location where a positive electrode of the first cell 271 is connected to a negative electrode of the second cell 272. In a third current path 206 between a positive electrode of the second cell 272 and the third terminal 203, a second switching circuit 240 is inserted.

For example, the first switching circuit 230 includes a charge control transistor 231 of which a gate is connected to a charge control terminal 211 (COUT terminal), and includes a discharge control transistor 232 of which a gate is connected to a discharge control terminal 212 (DOUT terminal). The charge control transistor 231 cuts off the first current path 205 to which a charge current from the first cell 271 flows. The charge control transistor 232 cuts off the first current path 205 to which a discharge current from the first cell 271 flows. Each of the charge control transistor 231 and the discharge control transistor 232 is a switching element that switches between conduction and interruption of the first current path 205. The charge control transistor 231 and the discharge control transistor 232 are inserted in the first current path 205. For example, each of the charge control transistor 231 and the discharge control transistor 232 is an NMOS transistor. The charge control transistor 231 has a parasitic diode between a drain and a source. The discharge control transistor 232 has a parasitic diode between a drain and a source.

For example, the second switching circuit 240 includes a charge control transistor 241 of which a gate is connected to a charge control terminal 221 (COUT terminal), and includes a discharge control transistor 242 of which a gate is connected to a discharge control terminal 222 (DOUT terminal). The charge control transistor 241 cuts off the third current path 206 to which a charge current from the second cell 272 flows. The discharge control transistor 242 cuts off the third current path 206 to which a discharge current from the second cell 272 flows. Each of the charge control transistor 241 and the discharge control transistor 242 is a switching element that switches between conduction and interruption of the third current path 206. The charge control transistor 241 and the discharge control transistor 242 are inserted in the third current path 206. For example, each of the charge control transistor 241 and the discharge control transistor 242 is a PMOS transistor. The charge control transistor 241 has a parasitic diode between a drain and a source. The discharge control transistor 242 has a parasitic diode between a drain and a source.

The first protection IC 210 is an integrated circuit that operates in accordance with a battery voltage (which is also referred to as a "cell voltage") across positive and negative electrodes of the first cell 271. The first protection IC 210 includes a charge control terminal 211 (COUT terminal); a discharge control terminal 212 (DOUT terminal); a monitor terminal 218 (VM1 terminal); a power supply terminal 215 (VDD terminal); and a ground terminal 213 (VSS terminal).

The charge control terminal 211 is connected to the gate of the charge control transistor 231. A signal is outputted from the charge control terminal 211 to turn on or off the charge control transistor 231. The discharge control terminal 212 is connected to the gate of the discharge control transistor 232. A signal is outputted from the discharge control terminal 212 to turn on or off the discharge control transistor 232.

The monitor terminal 218 is used to monitor a potential at the first terminal 201 and is connected to the first terminal 201. For example, the monitor terminal 218 is used to determine whether the protection IC 210 is connected to a load 191 or a charger that is not shown. The monitor terminal 218 is connected, via a resistor 214, to the first current path 205 between the first switching circuit 230 and the first terminal 201.

The power supply terminal 215 is a high side power supply terminal of the first protection IC 210. The power supply terminal 215 is connected to the positive electrode of the first cell 271, via a resistor 237 and the second current path 204. The ground terminal 213 is a low side power supply terminal of the first protection IC 210. The ground terminal 213 is connected to the negative electrode of the first cell 271, via the first current path 205.

The first protection IC 210 is an integrated circuit that turns off the first switching circuit 230 to protect the first cell 271 or both of the cells 271 and 272. The first protection IC 210 turns off the charge control transistor 231 to protect the first cell 271 against charge abnormalities such as overcharge. The first protection IC 210 turns off the discharge control transistor 232 to protect the first cell 271 against discharge abnormalities such as overcharge; or shorting abnormalities.

The first protection IC 210 detects a state of the first cell 271. The first protection IC 210 monitors a power supply voltage Vd that is a voltage across the VDD terminal 215 and the VSS terminal 213. The VDD terminal 215 is connected to the positive electrode of the first cell 271, and the VSS terminal 213 is connected to the negative electrode of the first cell 271. In this case, a power supply voltage Vd is approximately equal to a cell voltage VBAT across the first cell 271. Thus, the first protection IC 210 can monitor a power supply voltage Vd to detect a cell voltage VBAT across the first cell 271. The first protection IC 210 also monitors a monitor voltage V− that is a voltage across the VM1 terminal 211 and the VSS terminal 213, where a potential at the VSS terminal 213 is used as a reference potential.

For example, when a power supply voltage Vd that is higher than a predetermined overcharge-detection voltage Vdet1 is detected, the first protection IC 210 generates an overcharge-detection signal indicating that the power supply voltage Vd is detected to be higher than the overcharge-detection voltage Vdet1. Also, for example, when a power supply voltage Vd that is lower than a predetermined overcharge-return voltage Vrel1 is detected, the first protection IC 210 generates an overcharge-return detection signal indicating that the power supply voltage Vd is detected to be lower than the overcharge-return voltage Vrel1. The overcharge-detection voltage Vret1 is a threshold that is used in overcharge detection, and the overcharge-return voltage Vrel1 is a threshold that is used to determine whether to return to a normal state after overcharge detection.

For example, when a power supply voltage Vd that is lower than a predetermined overdischarge-detection voltage Vdet2 is detected, the first protection IC 210 generates an overdischarge-detection signal indicating that the power supply voltage Vd is detected to be lower than the overdischarge-detection voltage Vdet2. Also, for example, when a power supply voltage Vd that is higher than a predetermined overdischarge-return voltage Vrel2 is detected, the first protection IC 210 generates an overdischarge-return detection signal indicating that the power supply voltage Vd is detected to be higher than the overdischarge-return voltage Vrel2. The overdischarge-detection voltage Vdet2 is a threshold that is used in overdischarge detection, and the overdischarge-return voltage Vrel2 is a threshold that is used to determine whether to return to a normal state after overdischarge detection.

For example, when a monitor voltage V− that is higher than a predetermined discharge-overcurrent detection voltage Vdet3 is detected, the first protection IC 210 generates a discharge-overcurrent detection signal indicating that the monitor voltage V− is detected to be higher than the discharge-overcurrent detection voltage Vdet3. Also, for example, when a monitor voltage V− that is lower than a predetermined discharge-overcurrent return voltage Vrel3 is detected, the first protection IC 210 generates a discharge-overcurrent return detection signal indicating that the monitor voltage V− is detected to be lower than the discharge-overcurrent return voltage Vrel3. The discharge-overcurrent detection voltage Vdet3 is a threshold that is used in discharge-overcurrent detection. The discharge-overcurrent return voltage Vrel3 is a threshold that is used to determine whether to return to a normal state after discharge-overcurrent detection.

For example, when a monitor voltage V− that is lower than a predetermined charge-overcurrent detection voltage Vdet4 is detected, the first protection IC 210 generates a charge-overcurrent detection signal indicating that the monitor voltage V− is detected to be lower than the charge-overcurrent detection voltage Vdet4. Also, for example, when a monitor voltage V− that is higher than a predetermined charge-overcurrent return voltage Vrel4 is detected, the first protection IC 210 generates a charge-overcurrent return detection signal indicating that the monitor voltage V− is detected to be higher than the charge-overcurrent return voltage Vrel4. The charge-overcurrent detection voltage Vdet4 is a threshold that is used in charge-overcurrent detection. The charge-overcurrent return voltage Vrel4 is a threshold that is used to determine whether to return to a normal state after charge-overcurrent detection.

When overcharge or charge overcurrent in the first cell 271 is detected, after a certain delay, the first protection IC 210 changes an output status of the COUT terminal 211 from a high level to a low level. When the output state of the COUT terminal 211 is changed to the low level, the charge control transistor 231 is turned off, and thus a current flow that allows for charge in the first cell 271 is prevented. Thereby, the charge in the first cell 271 is interrupted, and thus the first cell 271 can be protected against the overcharge or the charge overcurrent.

On the other hand, when overdischarge from the first cell 271 or discharge overcurrent in the first cell 271 is detected, after a certain delay, the first protection IC 210 changes an output status of the DOUT terminal 212 from a high level to a low level. When the output state of the DOUT terminal 212 is changed to the low level, the charge control transistor 232 is turned off, and thus a current flow that allows for discharge from the first cell 271 is prevented. Thereby, the discharge from the first cell 271 is interrupted, and thus the first cell 271 can be protected against the overdischarge or the discharge overcurrent.

The second protection IC 220 is an integrated circuit that operates in accordance with a battery voltage (which is also referred to as a "cell voltage") across positive and negative electrodes of the second cell 272. The second protection IC 220 includes a charge control terminal 221 (COUT terminal); a discharge control terminal 222 (DOUT terminal); a monitor terminal 228 (VM2 terminal); a power supply terminal 225 (VDD terminal); and a ground terminal 223 (VSS terminal).

The charge control terminal 221 is connected to the gate of the charge control transistor 241. A signal is outputted from the charge control terminal 221 to turn on or off the charge control transistor 241. The discharge control terminal 222 is connected to the gate of the discharge control transistor 242. A signal is outputted from the discharge control terminal 222 to turn on or off the discharge control transistor 242.

The monitor terminal 228 is used to monitor a potential at the third terminal 203, and is connected to the third terminal 203. For example, the monitor terminal 228 is used to determine whether the protection IC 220 is connected to a load 192 or a charger that is not shown. The monitor terminal 228 is connected, via a resistor 224, to the third current path 206 between the second switching circuit 240 and the third terminal 203.

The power supply terminal 225 is a high side power supply terminal of the second protection IC 220. The power supply terminal 225 is connected to the positive electrode of the second cell 272, via a resistor 247 and the third current path 206. The ground terminal 223 is a low side power supply terminal of the second protection IC 220. The ground terminal 223 is connected to the negative electrode of the second cell 272, via the second current path 204.

The second protection IC 220 is an integrated circuit that turns off the second switching circuit 240 to protect the second cell 272 or both of the cells 271 and 272. The second protection IC 220 turns off the charge control transistor 241 to protect the second cell 272 against charge abnormalities such as overcharge. The second protection IC 220 turns off the discharge control transistor 242 to protect the second cell 272 against discharge abnormalities such as overcharge; or shorting abnormalities.

The second protection IC 220 detects a state of the second cell 272. The second protection IC 220 monitors a power supply voltage Vd that is a voltage across the VDD terminal 225 and the VSS terminal 223. The VDD terminal 225 is connected to the positive electrode of the second cell 272, and the VSS terminal 223 is connected to the negative electrode of the second cell 272. In this case, a power supply voltage Vd is approximately equal to a cell voltage VBAT across the second cell 272. Thus, the second protection IC 220 can monitor a power supply voltage Vd to detect a cell voltage VBAT across the second cell 272. The second protection IC 220 also monitors a monitor voltage V+ that is a voltage across the VM2 terminal 228 and the VDD terminal 225, where a potential at the VDD terminal 225 is used as a reference potential.

The second protection IC 220 may detect overcharge in the second cell 272 or overdischarge from the second cell 272, as in the same manner as that using the threshold described in the first protection IC 210.

For example, when a monitor voltage V+ that is lower than a predetermined discharge-overcurrent detection voltage Vdet3 is detected, the second protection IC 220 generates a discharge-overcurrent detection signal indicating that the monitor voltage V+ is detected to be lower than the discharge-overcurrent detection voltage Vdet3. Also, for example, when a monitor voltage V+ that is higher than a predetermined discharge-overcurrent return voltage Vrel3 is detected, the second protection IC 220 generates a discharge-overcurrent return detection signal indicating that the monitor voltage V+ is detected to be higher than the discharge-overcurrent return voltage Vrel3.

For example, when a monitor voltage V+ that is higher than a predetermined charge-overcurrent detection voltage Vdet4 is detected, the second protection IC 220 generates a charge-overcurrent detection signal indicating that the monitor voltage V+ is detected to be higher than the charge-overcurrent detection voltage Vdet4. Also, for example, when a monitor voltage V+ that is lower than a predetermined charge-overcurrent return voltage Vrel4 is detected, the second protection IC 220 generates a charge-overcurrent return detection signal indicating that the monitor voltage V+ is detected to be lower than the charge-overcurrent return voltage Vrel4.

When overcharge or charge overcurrent in the second cell 272 is detected, after a certain delay, the second protection IC 220 changes an output status of the COUT terminal 221 from a high level to a low level. When the output state of the COUT terminal 221 is changed to the low level, the charge control transistor 241 is turned off, and thus a current flow that allows for charge in the second cell 272 is prevented. Thereby, the charge in the second cell 272 is interrupted, and thus the second cell 272 can be protected against the overcharge or the charge overcurrent.

On the other hand, when overdischarge from the second cell 272 or discharge overcurrent in the second cell 272 is detected, after a certain delay, the second protection IC 220 changes an output status of the DOUT terminal 222 from a high level to a low level. When the output state of the DOUT terminal 222 is changed to the low level, the discharge control transistor 242 is turned off, and thus a current flow that allows for discharge from the second cell 272 is prevented. Thereby, the discharge from the second cell 272 is interrupted, and thus the second cell 272 can be protected against the overdischarge or the discharge overcurrent.

For example, when the first switching circuit 230 is turned on by the first protection IC 210 and the second switching circuit 240 is turned on by the second protection IC 220, such a state is defined as a "normal state." In a normal state, the secondary-battery protection circuit 110 supplies, to the first load 191, a first output voltage Vo1 corresponding to a voltage across the first cell 271, via the first terminal 201 and the second terminal 202. In a normal state, the secondary-battery protection circuit 110 supplies a third output voltage Vo3 to the second load 192, via the first terminal 201 and the third terminal 203. Where, the third output voltage Vo3 indicates the sum of a first output voltage Vo1 and a second output voltage Vo2 corresponding to a voltage across the second cell 272.

For example, when the first switching circuit 230 is turned off by the first protection IC 210 and the second switching circuit 240 is turned on by the second protection IC 220, such a state is defined as a "first protection state." In a first protection state, the secondary-battery protection circuit 110 stops supplying a first output voltage Vo1 to the first load 191, via the first terminal 201 and the second terminal 202, and stops supplying a third output voltage Vo3, via the first terminal 201 and the third terminal 203. This is because, when a normal state transitions to a first protection state, a potential at the first terminal 201 varies from a potential at the negative electrode of the first cell 271, to a potential at the positive electrode of the second cell 272.

For example, when the first switching circuit 230 is turned on by the first protection IC 210 and the second switching circuit 240 is turned off by the second protection IC 220, such a state is defined as a "second protection state". In a second protection state, the secondary-battery protection circuit 110 supplies a first output voltage Vo to the first load 191, via the first terminal 201 and the second terminal 202, and stops supplying a third output voltage Vo3 via the first terminal 201 and the third terminal 203. This is because, when a normal state transitions to a second protection state, a potential at the third terminal 203 varies from a potential at the positive electrode of the second cell 272, to a potential at the negative electrode of the first cell 271 while a potential at each of the first terminal 201 and the second terminal 202 does not change.

As described above, in the comparative example that protects the cells 271 and 272, a first output voltage Vo can be supplied to the first load 191 and a third output voltage Vo3 can be supplied to the second load 192. Thereby, with respect to a device (device having a first load 191 and a second load 192) to which power is supplied from the battery pack 100, voltage conversion is prevented, thereby improving power efficiency at a given device. In other words, power supplied from the battery pack 100 to the device can be consumed efficiently.

The first protection IC 210 may include a first protection element 236 that constitutes an internal current path between the monitor terminal 218 and the power supply terminal 215. Similarly, the second protection IC 220 may include a second protection element 246 that constitutes an internal current path between the ground terminal 223 and the monitor terminal 228. Each of the protection elements 236 and 246 is an anti-static diode element, for example. In such a manner of using the protection elements 236 and 246, in a first protection state or a second protection state, a forward voltage may be applied to the protection element 236 or the protection element 246. In a given protection element to which a forward voltage is applied, a current path is formed, and thus a current continues to flow through the protection element.

Hereafter, in a first protection state or a second protection state, a case where a forward voltage is applied to the protection element 236 or the protection element 246 will be described with reference to FIGS. 2 to 5. Note that in FIGS. 2 to 5, a voltage across each of the cells 271 and 272 is set to be 4 V in a normal state.

Figure 2:
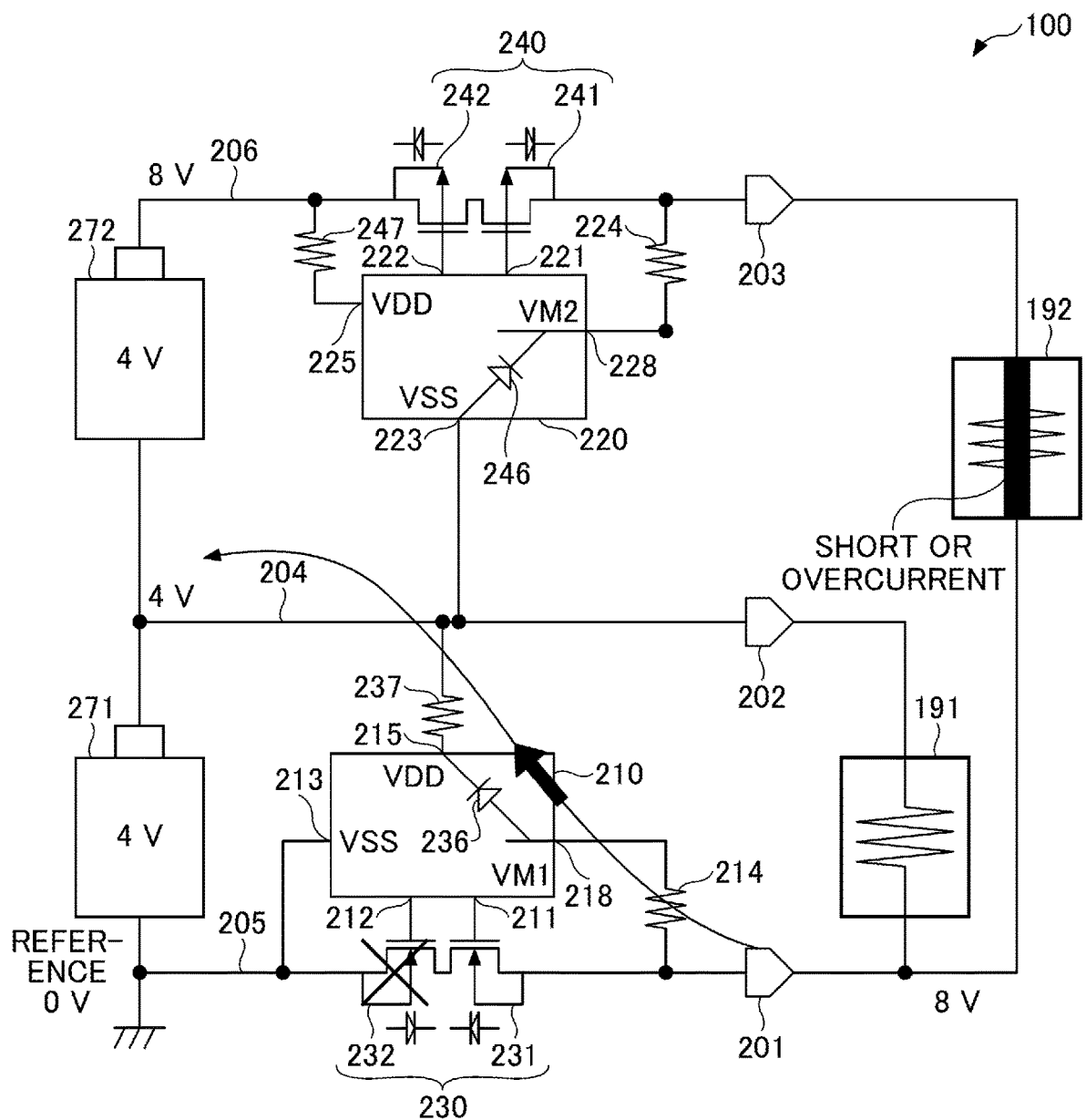
FIG. 2 is a diagram illustrating an example of a manner in which discharge overcurrent is detected by a low side protection IC in the battery pack in FIG. 1.

FIG. 2 is a diagram illustrating an example of a manner in which discharge overcurrent is detected by a low side first protection IC 210 in the battery pack 100 in FIG. 1. The first protection IC 210 turns off a discharge control transistor 232 (in a first protection state), when detecting discharge overcurrent flowing via shorting or the like of a second load 192. In such a first protection state, a potential at a first terminal 201 changes from 0 V to 8 V. As a result, as illustrated by an arrow in FIG. 2, an internal current path is formed through a first protection element 236, which may result in a flow of unintentional current.

Figure 3:
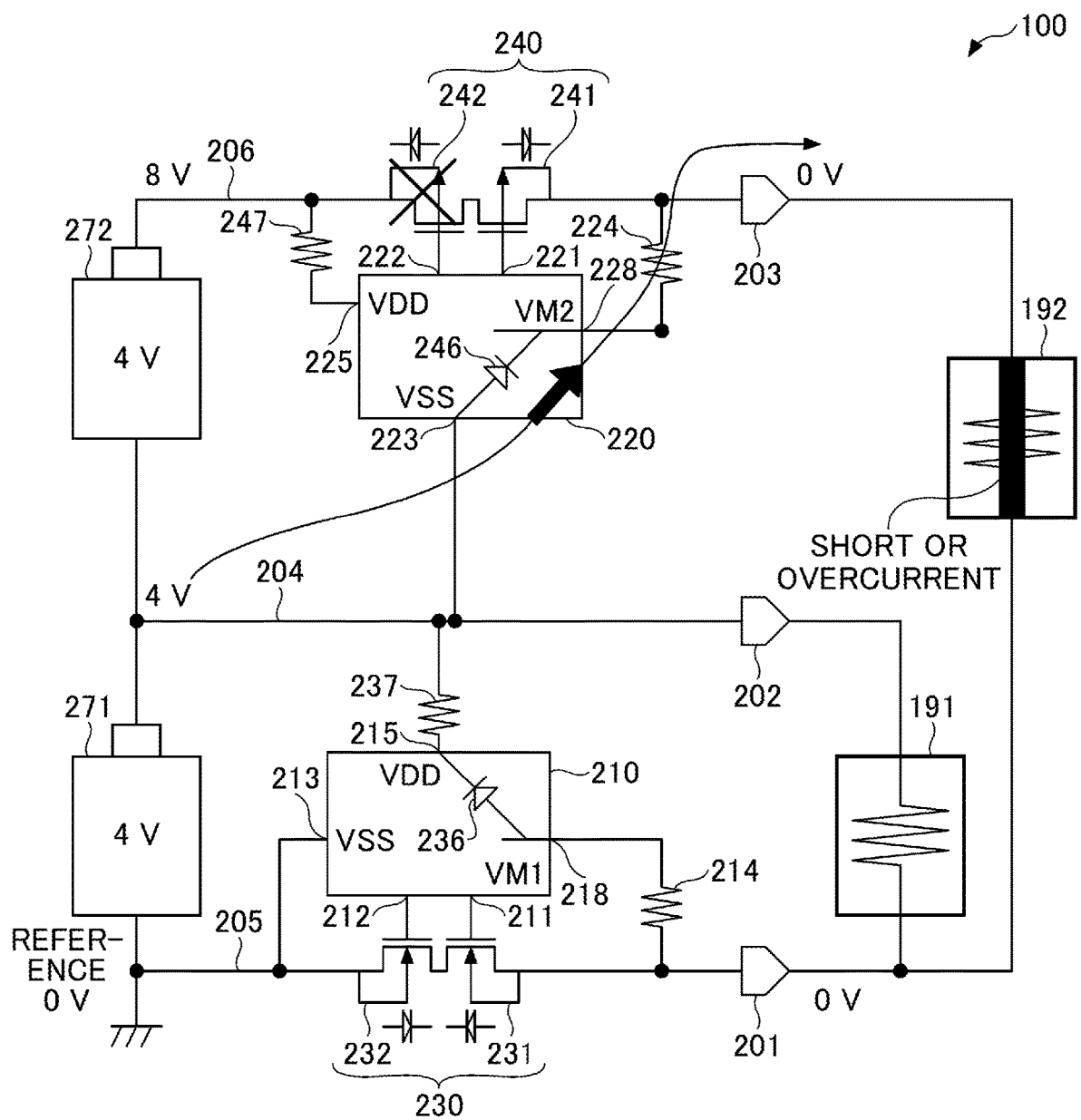
FIG. 3 is a diagram illustrating an example of a manner in which discharge overcurrent is detected by a high side protection IC in the battery pack in FIG. 1.

FIG. 3 is a diagram illustrating an example of a manner in which discharge overcurrent is detected by a high side second protection IC 220 in the battery pack 100 in FIG. 1. The second protection IC 220 turns off a discharge control transistor 242 (in a second protection state), when detecting discharge overcurrent flowing via shorting or the like of a second load 192. In such a second protection state, a potential at a third terminal 203 changes from 8 V to 0 V. As a result, as illustrated by an arrow in FIG. 3, an internal current path is formed through a second protection element 246, which may result in a flow of unintended current.

Figure 4:
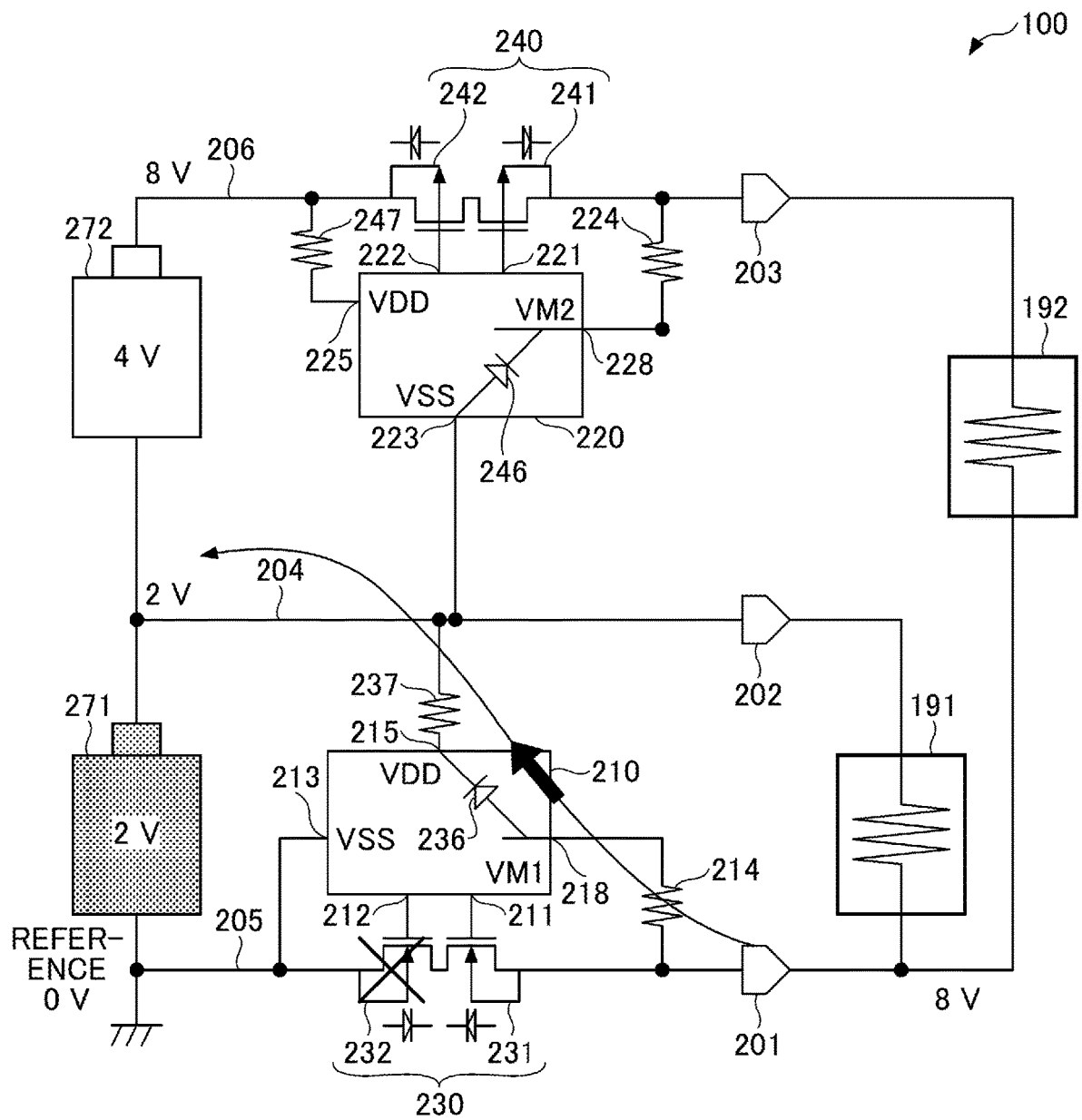
FIG. 4 is a diagram illustrating an example of a manner in which overdischarge from a low side secondary battery is detected by a low side protection IC in the battery pack in FIG. 1.

FIG. 4 is a diagram illustrating an example of a manner in which overdischarge from a low side first cell 271 is detected by a low side first protection IC 210 in the battery pack 100 in FIG. 1. The first protection IC 210 turns off a discharge control transistor 232 (in a first protection state), when detecting overdischarge from the first cell 271. In such a first protection state, a potential at a first terminal 201 changes from 0 V to 8 V. As a result, as illustrated by an arrow in FIG. 4, an internal current path is formed through a first protection element 236, which may result in a flow of unintentional current.

Figure 5:
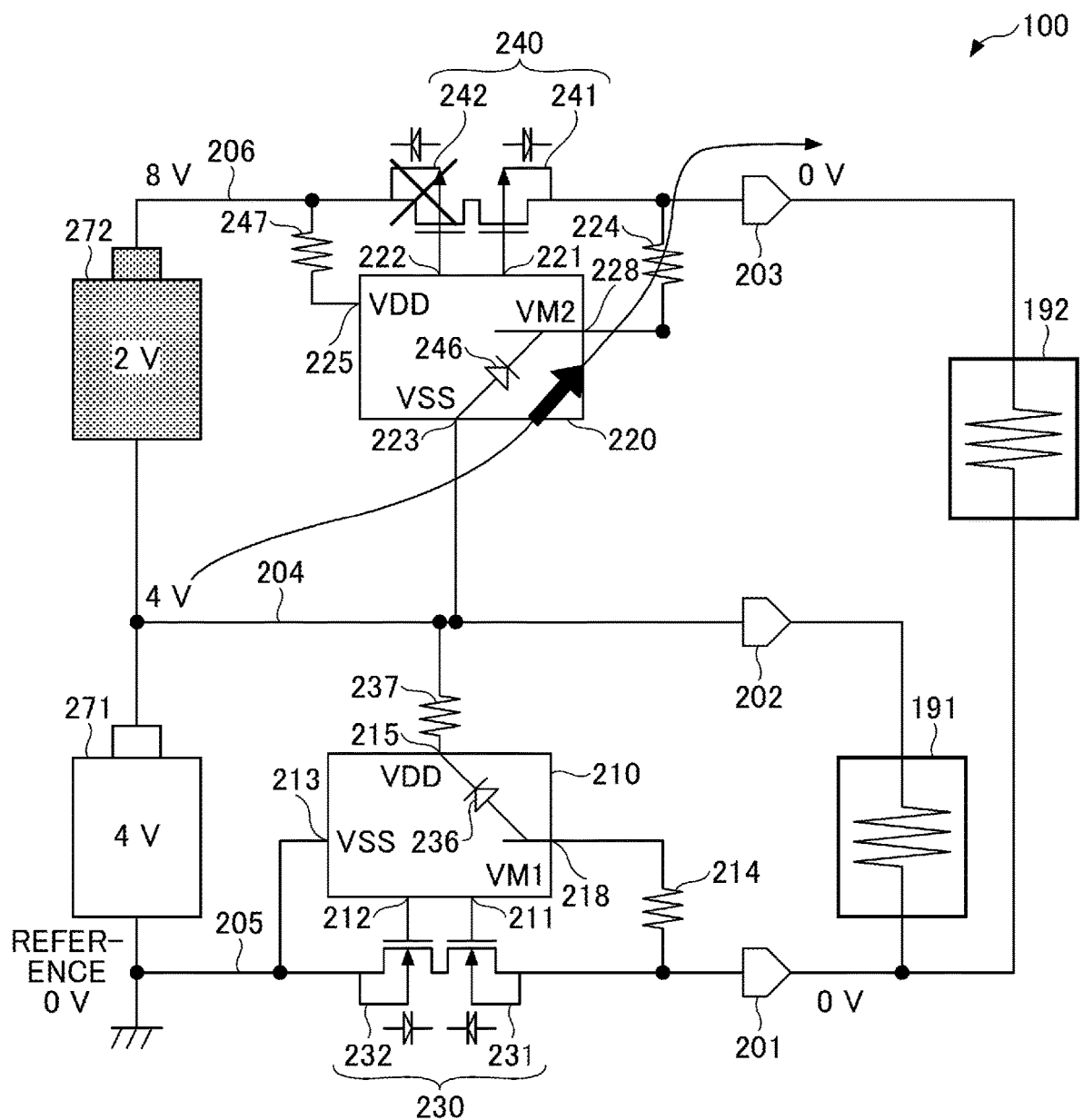
FIG. 5 is a diagram illustrating an example of a manner in which overdischarge from a high side secondary battery is detected by a high side protection IC in the battery pack in FIG. 1.

FIG. 5 is a diagram illustrating an example of a manner in which overcharge from a high side second cell 272 is detected by a high side protection IC 210 in the battery pack 100 in FIG. 1. The second protection IC 220 turns off a discharge control transistor 242 (in a second protection state), when detecting overdischarge from the second cell 272. In such a second protection state, a potential at a third terminal 203 changes from 8 V to 0 V. As a result, as illustrated by an arrow in FIG. 5, an internal current path is formed through a second protection element 246, which may result in a flow of unintentional current.

With reference to FIGS. 6 to 20, one or more embodiments will be described below to prevent an unintended current flow even in a case of using protection elements such as the protection elements 236 and 246.

First Embodiment

Figure 6:
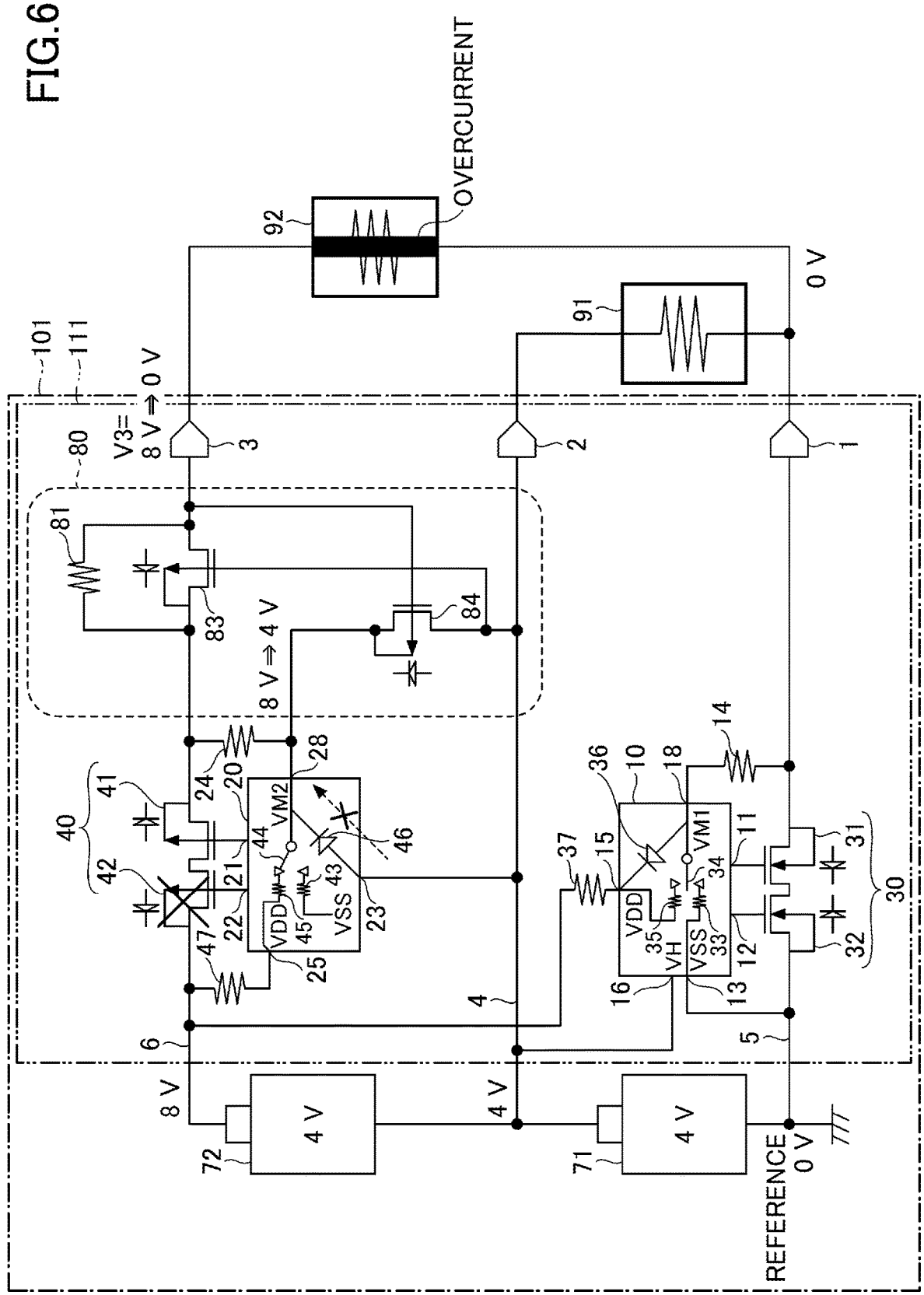
FIG. 6 is a diagram illustrating an example of a manner in which discharge overcurrent is detected by a high side protection IC in a battery pack according to a first embodiment.

FIG. 6 is a diagram illustrating an example of a configuration of a battery pack according to a first embodiment in which discharge overcurrent is detected by a high side protection IC. Note that in the first embodiment, explanation will be omitted or be simplified for elements or effects that are identical or sufficiently similar to elements or effects that have been described in the comparative example.

As illustrated in FIG. 6, a battery pack 101 includes a first secondary battery 71 and a second secondary battery 72 that are connected, and includes a secondary-battery protection circuit 111 that protects each of the first secondary battery 71 and the second secondary battery 72. The secondary-battery protection circuit 111 supplies a voltage across each of the connected first and second secondary batteries, as well as a voltage indicating the sum of voltages across the respective first and second secondary batteries.

In the following description, the first secondary battery 71 and the second secondary battery 72 are also referred to as a first cell 71 and a second cell 72, respectively. The first secondary battery 71 and the second secondary battery 72 are also referred to as cells 71 and 72, respectively.

The secondary-battery protection circuit 111 includes a first terminal 1, a second terminal 2, and a third terminal 3. The secondary-battery protection circuit 111 includes a first switching circuit 30, a second switching circuit 40, a first protection IC 10, and a second protection IC 20. The first terminal 1 is an example of a first output terminal connected to a negative electrode of a first secondary battery. The second terminal 2 is an example of a second output terminal connected to both of a positive electrode of a first secondary battery and a negative electrode of a second secondary battery. The third terminal 3 is an example of a third output terminal connected to a positive electrode of a second secondary battery.

In a first current path 5 between the negative electrode of the first cell 71 and the first terminal 1, the first switching circuit 30 is inserted. A second current path 4 is connected between the negative electrode of the second cell 72 and a location where a positive electrode of the first cell 71 is connected to a negative electrode of the second cell 72. In a third current path 6 between a positive electrode of the second cell 72 and the third terminal 3, the second switching circuit 40 is inserted.

For example, the first switching circuit 30 includes a charge control transistor 31 that is a switch and of which a gate is connected to a charge control terminal 11 (COUT terminal), and includes a discharge control transistor 32 that is a switch and of which a gate is connected to a discharge control terminal 12 (DOUT terminal).

For example, the second switching circuit 40 includes a charge control transistor 41 that is a switch and of which a gate is connected to a charge control terminal 21 (COUT terminal), and includes a discharge control transistor 42 that is a switch and of which a gate is connected to a discharge control terminal 22 (DOUT terminal). The discharge control transistor 42 is an example of a second switch disposed in a discharge path.

The first protection IC 10 includes a first monitor terminal 18 (VM1 terminal), which is connected, via a resistor 14, to the first current path 5 between the first terminal 1 and the first switching circuit 30, and includes a first power supply terminal 15 (VDD terminal) that is connected to the positive electrode of the second cell 72 via a resistor 37. The first protection IC 10 also includes a charge control terminal 11 (COUT terminal), a discharge control terminal 12 (DOUT terminal), a cell voltage input terminal 16 (VH terminal), and a ground terminal 13 (VSS terminal). The first protection IC 10 further includes a first protection element 36 that configures an internal current path between the first monitor terminal 18 and the first power supply terminal 15. The first protection IC 10 is an example of a first protection circuit that includes a first switch disposed in a discharge path, the first protection circuit being configured to protect a first secondary battery against overdischarge or discharge overcurrent, through the first switch.

The second protection IC 20 includes a second monitor terminal 28 (VM2 terminal), which is connected, via a resistor 24, to a third current path 6 between the third terminal 3 and the second switching circuit 40, and includes a ground terminal 23 (VSS terminal) that is connected to the negative electrode of the second cell 72. The second protection IC 20 includes a charge control terminal 21 (COUT terminal), a discharge control terminal 22 (DOUT terminal), and a second power supply terminal 25 (VDD terminal) that is connected to the positive electrode of the second cell 72, via a resistor 47. The second protection IC 20 further includes a second protection element 46 forming an internal current path between the ground terminal 23 and the second monitor terminal 28. The second protection IC 20 is an example of a second protection circuit that includes a second switch disposed in a discharge path, the second protection circuit being configured to protect a second secondary battery against overdischarge or discharge overcurrent, through the second switch.

When detecting an off state of the second monitor terminal 28, an off-state detecting circuit 80 fixes a potential at the second monitor terminal 28 to interrupt a current flowing into the second protection element 46. The off-state detecting circuit 80 includes a switch 83, a switch 84, and a resistor 81. Each of the switches 83 and 84 is a PMOS transistor, for example.

The switch 83 is inserted between a resistor 24 and the third terminal 3. A gate of the switch 83 is connected to the second terminal 2. The resistor 81 is connected in parallel to the switch 83. The switch 83 is an element that detects a relation between potentials at the second terminal 2 and the third terminal 3 and that interrupts (i.e., switches from on to off) current when such a relation is reversed.

One end of the switch 84 is connected to the monitor terminal 28, and another end is connected to the second terminal 2. A gate of the switch 84 is connected to the third terminal 3. The switch 84 is an element that operates so as to be inverted with respect to the switch 83. The element fixes a potential at the VM2 terminal when the current is interrupted by the switch 83.

The resistor 81 is an element that allows the second protection IC 20 to monitor a potential at the third terminal 3, through the VM2 terminal, in a case where the switch 83 is turned off and the third terminal 3 is disconnected from the VM2 terminal.

Figure 7:
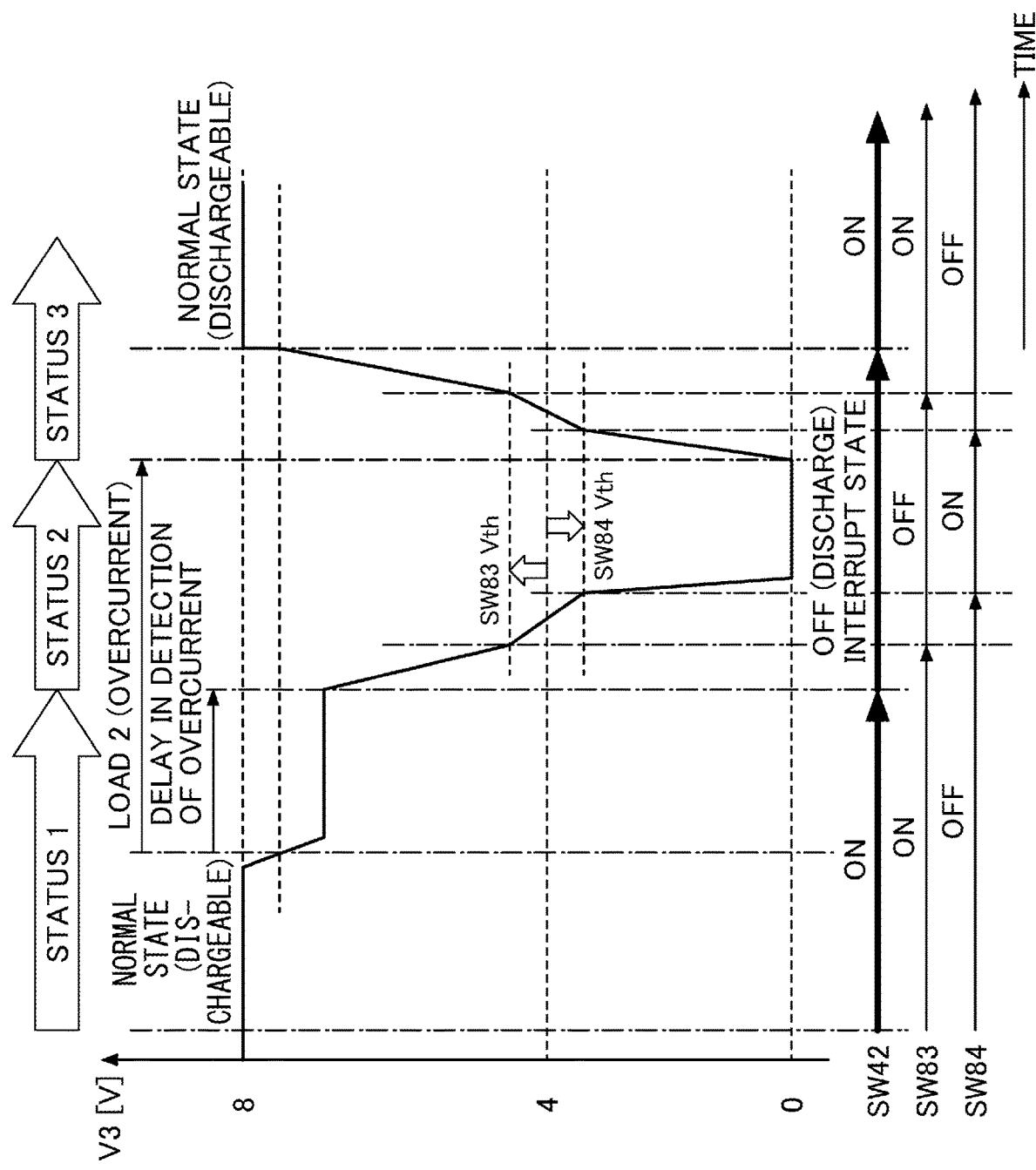
FIG. 7 is a timing chart illustrating an example of a manner before and after detecting discharge overcurrent by the high side protection IC in the battery pack according to the first embodiment.

In the example of the battery pack 101 in FIG. 6, discharge overcurrent is detected by the high side second protection IC 20. The second protection IC 20 turns off a discharge control transistor 42 (in a second protection state), when detecting discharge overcurrent flowing via shorting or the like of a second load 92. FIG. 7 is a timing chart illustrating an example of a manner before and after detecting discharge overcurrent by the high side second protection IC 20 in the battery pack 101 according to the first embodiment. In FIG. 7, SW42, SW83, and SW84 respectively indicate a discharge control transistor 42, switches 83 and 84, and Vth indicates a given threshold voltage across each of the switches 83 and 84.

Status 1: in a rechargeable normal state (normal state), when discharge overcurrent is detected due to shorting of a second load 92, after a delay in detection of overcurrent, a second protection IC 20 turns off a discharge control transistor 42 to interrupt discharge.

Status 2: when the discharge control transistor 42 is turned off, a potential V3 at the third terminal 3 changes from 8 V to 0 V, so that the switch 83 is turned from on to off and the switch 84 is turned from off to on. In this case, the off-state detecting circuit 80 detects that the potential V3 at the third terminal 3 changes from 8 V to 0 V to detect an off state of the second switching circuit 40. When the switch 83 is turned from on to off and the switch 84 is turned from off to on, a potential at the monitor terminal 28 of the second protection IC 20 is approximately equal to a potential at the ground terminal 23, so that a current does not flow into the protection element 46. In the status 2, when discharge overcurrent is detected, a switch 44 is connected to the VDD terminal, and the VM2 terminal becomes connected to the VDD terminal via a resistor 45 and the switch 44, such that a potential at the VM2 terminal increases.

Status 3: when the second load 92 is released from the third terminal 3, a potential at the third terminal 3 increases from 0 V to a potential that is approximately equal to a potential at the second terminal 2, with being affected by resistors 45, 24, and 81. In this case, the switch 84, which has caused the VM2 terminal and the VSS terminal to be short-circuited, is turned from on to off. Further, when the potential at the third terminal 3 increases, the switch 83 is turned from off to on. When the potential at the third terminal 3 further increases, the second protection IC 20 detects that a potential at the VM2 terminal changes from a level corresponding to a potential at the VSS terminal, to a level corresponding to a potential at the VDD terminal, with being affected by the resistor 45. As a result, the second protection IC 20 turns the discharge control transistor 42, from off to on, so that a state of a protection circuit returns from a second protection state to a normal state.

As described above, in the first embodiment, in a second protection state, a current does not flow from the first cell 71 to the protection element 46. Thereby, in the second protection state, the secondary-battery protection circuit 111 interrupts a current flow to the second load 92 and the first load 91, the current flow being from the first cell 71, via the second protection IC 20.

Figure 8:
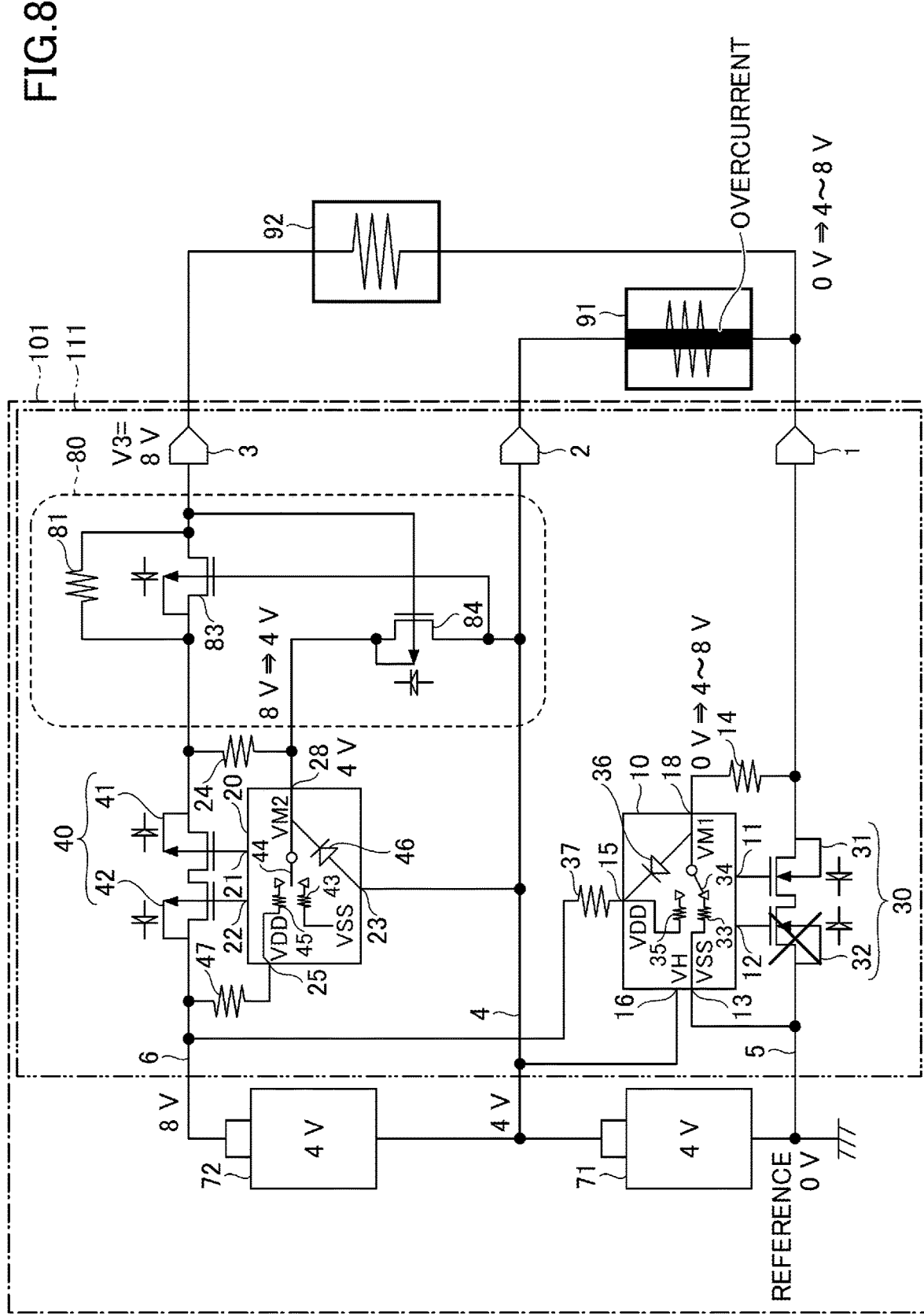
FIG. 8 is a diagram illustrating an example of a manner in which discharge overcurrent is detected by a low side protection IC in a battery pack according to the first embodiment.
Figure 9:
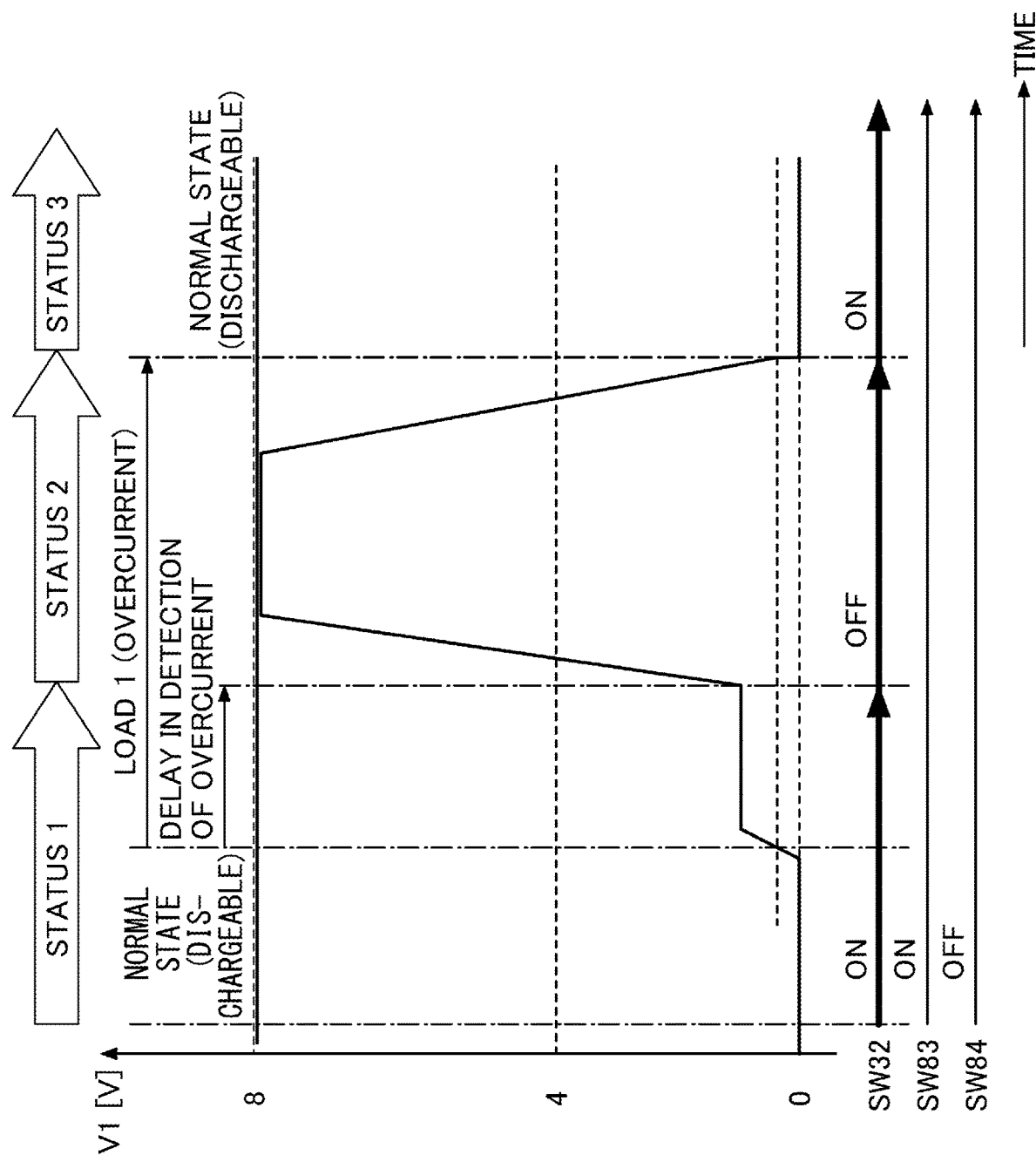
FIG. 9 is a timing chart illustrating an example of a manner before and after detecting discharge overcurrent by the low side protection IC in the battery pack according to the first embodiment.

FIG. 8 is a diagram illustrating an example of a manner in which discharge overcurrent is detected by a low side first protection IC 10 in a battery pack 101 according to the first embodiment. The first protection IC 10 turns off a discharge control transistor 32 (in a first protection state), when detecting discharge overcurrent flowing via shorting or the like of a first load 91. FIG. 9 is a timing chart illustrating an example of a manner before and after detecting discharge overcurrent by the low side first protection IC 10 in the battery pack 101 according to the first embodiment. In FIG. 8, SW32 indicates a discharge control transistor 32.

Status 1: in a rechargeable normal state (normal state), when discharge overcurrent is detected due to shorting of a first load 91, after a delay in detection of overcurrent, a first protection IC 10 turns off a discharge control transistor 32 to interrupt discharge.

Status 2: when the discharge control transistor 32 is turned off, a potential at each of a first terminal 1 and a VM1 terminal changes from 0 V, to a range of 4 V to 8 V. In this case, a power supply voltage across the first protection IC 10 is approximately equal to a potential difference between a negative electrode of a first cell 71 and a positive electrode of a second cell 72. A range of potentials at the VM2 terminal is not relevant. In the status 2, when discharge overcurrent is detected, a switch 34 is connected to the VSS terminal, and the VM1 terminal becomes connected to the VSS terminal via a resistor 33 and the switch 34, such that a potential at the VM1 terminal decreases.

As described above, in the first embodiment, in a first protection state, a current does not flow from a second cell 72 to a protection element 36. Thereby, the secondary-battery protection circuit 111 interrupts a current flow to a second load 92 and the first load 91, the current flow being from the second cell 72, via the first protection IC 10.

Second Embodiment

Figure 10:
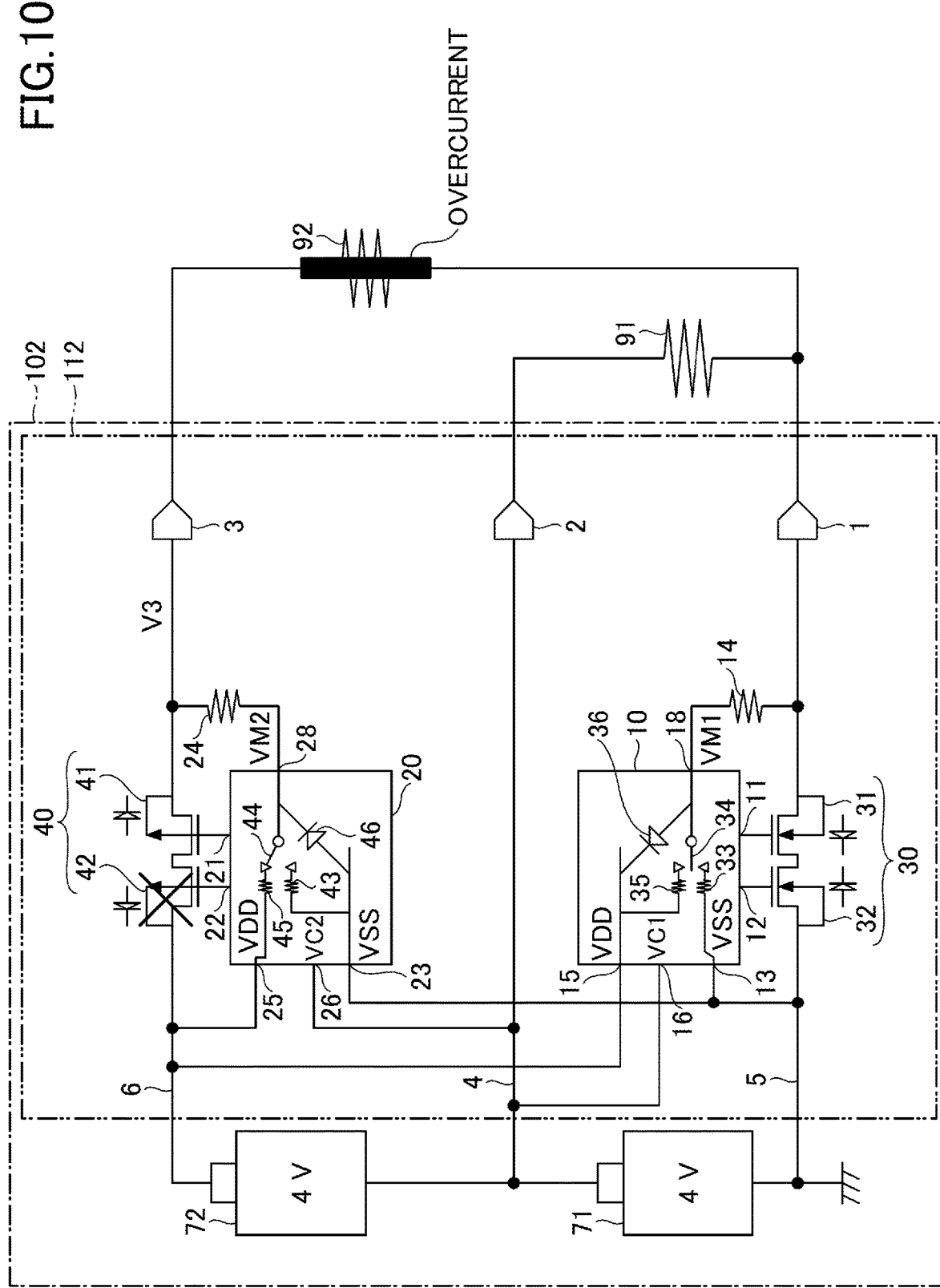
FIG. 10 is a diagram illustrating an example of a manner in which discharge overcurrent is detected by a high side protection IC in a battery pack according to a second embodiment.
Figure 11:
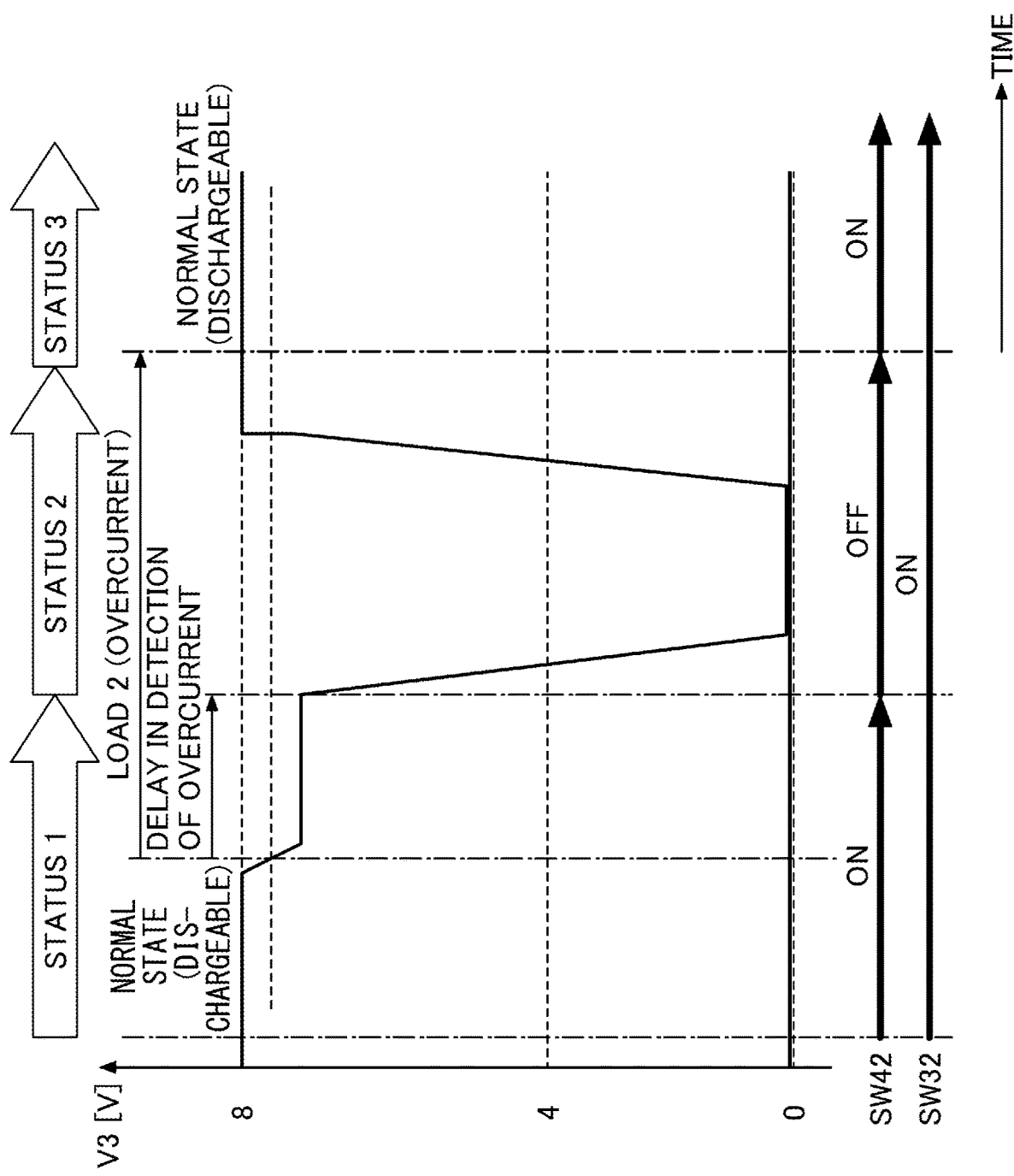
FIG. 11 is a timing chart illustrating an example of a manner before and after detecting discharge overcurrent by the high side protection IC in the battery pack according to the second embodiment.
Figure 12:
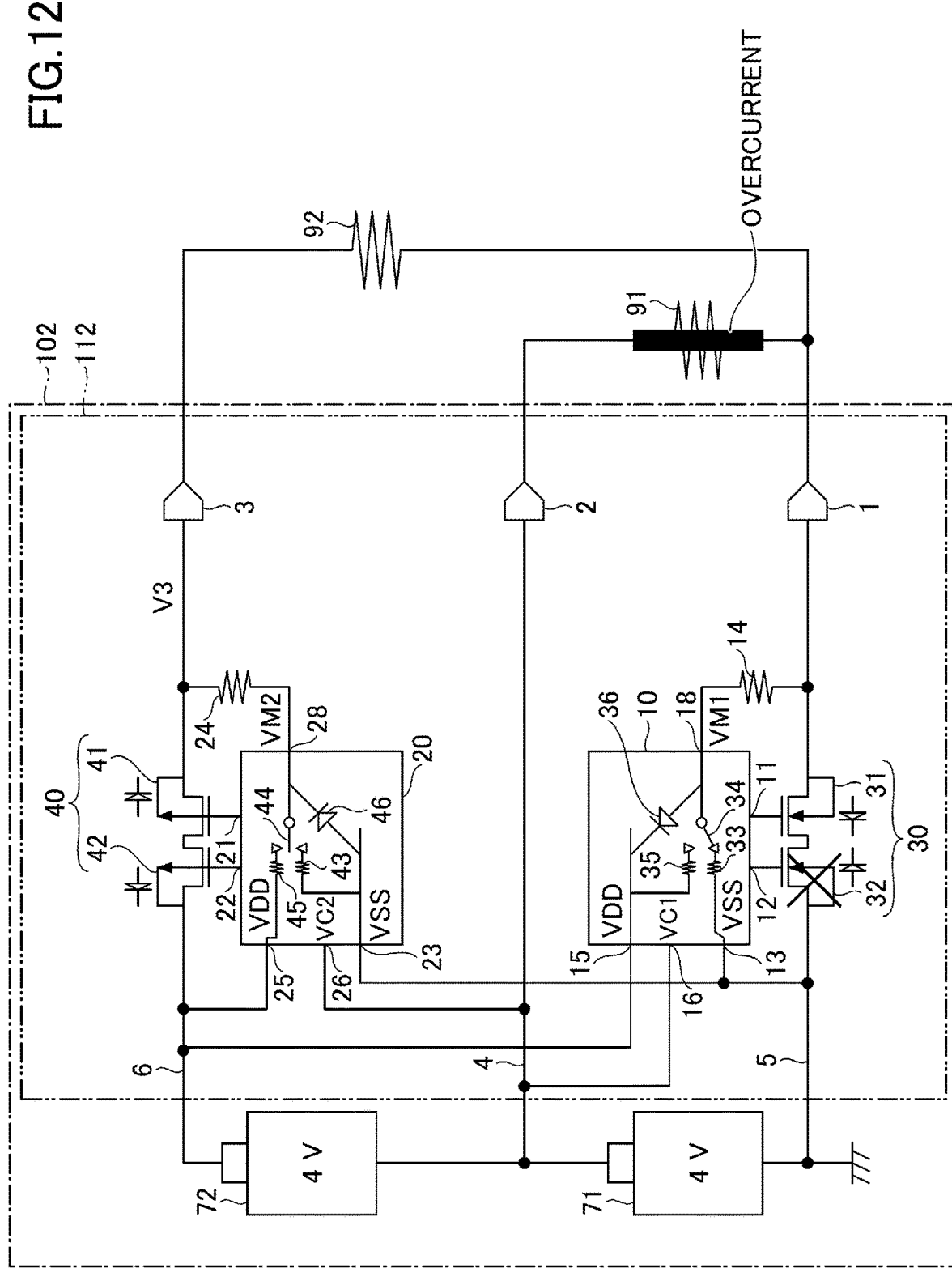
FIG. 12 is a diagram illustrating an example of a manner in which discharge overcurrent is detected by a low side protection IC in the battery pack according to the second embodiment.
Figure 13:
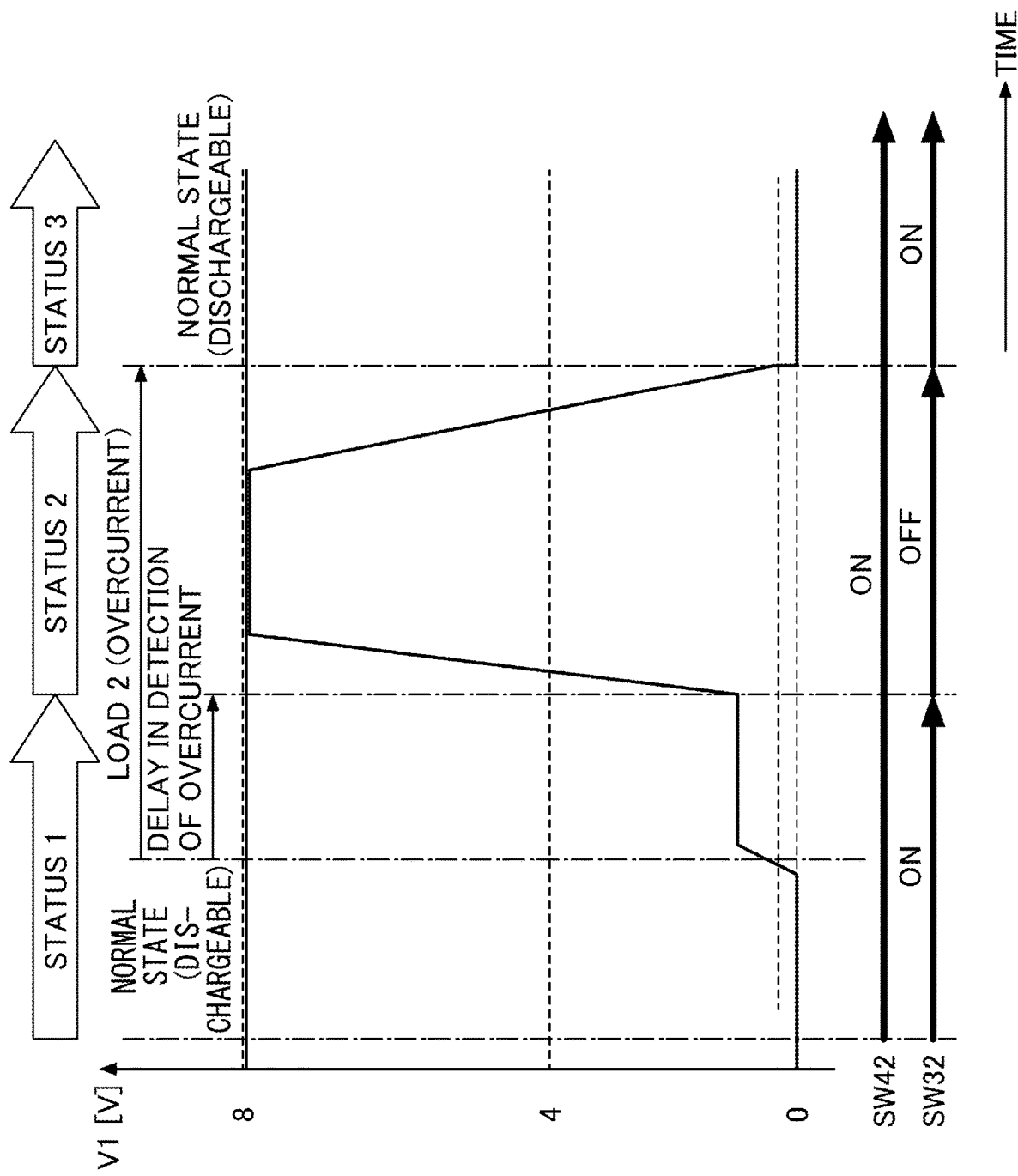
FIG. 13 is a timing chart illustrating an example of a manner before and after detecting discharge overcurrent by the low side protection IC in the battery pack according to the second embodiment.

FIG. 10 is a diagram illustrating an example of a manner in which discharge overcurrent is detected by a high side protection IC in a battery pack 102 according to a second embodiment. FIG. 11 is a timing chart illustrating an example of a manner before and after detecting discharge overcurrent by the high side protection IC in the battery pack 102 according to the second embodiment. FIG. 12 is a diagram illustrating an example of a manner in which discharge overcurrent is detected by a low side protection IC in the battery pack 102 according to the second embodiment. FIG. 13 is a timing chart illustrating an example of a manner before and after detecting discharge overcurrent by the low side protection IC in the battery pack 102 according to the second embodiment. Note that in the second embodiment, explanation will be omitted or be simplified for the same configuration and effect as those described in the first embodiment.

As illustrated in FIG. 10, the battery pack 102 includes a first secondary battery 71 and a second secondary battery 72 that are series-connected, and includes a secondary-battery protection circuit 112 that protects each of the first secondary battery 71 and the second secondary battery 72.

A first protection IC 10 includes a first monitor terminal 18 (VM1 terminal), which is connected, via a resistor 14, to a first current path 5 between a first terminal 1 and a first switching circuit 30, and includes a first power supply terminal 15 (VDD terminal) that is connected to a positive electrode of a second cell 72. The first protection IC 10 also includes a charge control terminal 11 (COUT terminal), a discharge control terminal 12 (DOUT terminal), a cell voltage input terminal 16 (VC1 terminal), and a ground terminal 13 (VSS terminal). The first protection IC 10 further includes a first protection element 36 that configures an internal current path between the first monitor terminal 18 and the first power supply terminal 15.

A second protection IC 20 includes a second monitor terminal 28 (VM2 terminal), which is connected, via a resistor 24, to a third current path 6 between a third terminal 3 and a second switching circuit 40, and includes a ground terminal 23 (VSS terminal) that is connected to a negative electrode of the second cell 72. The second protection IC 20 includes a charge control terminal 21 (COUT terminal), a discharge control terminal 22 (DOUT terminal), a cell voltage input terminal 26 (VC2), and a second power supply terminal 25 (VDD terminal). The second protection IC 20 further includes a second protection element 46 that configures an internal current path between the ground terminal 23 and the second monitor terminal 28.

In the second embodiment, a power supply voltage across each of the protection ICs 10 and 20 indicates a potential difference between a negative electrode of the cell 71 and a positive electrode of the cell 72. In this case, in a transition to a first protection state or a second protection state, a voltage associated with each of the monitor terminals 18 and 28 can be set to be in an allowable voltage range of a given IC. A range of potentials at a given monitor terminal is not relevant.

Third Embodiment

Figure 14:
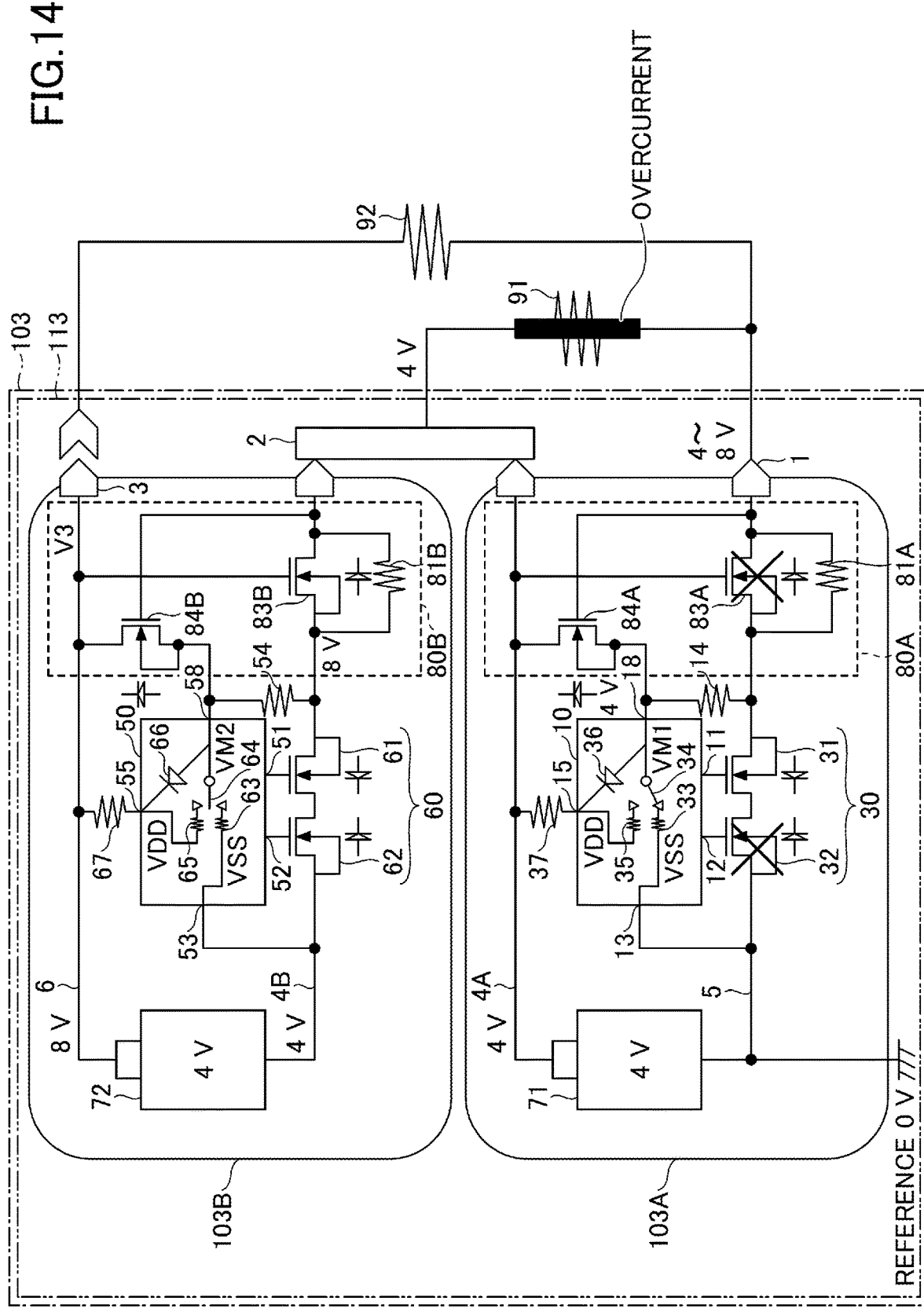
FIG. 14 is a diagram illustrating an example of a manner in which discharge overcurrent is detected by a low side protection IC in a battery pack according to a third embodiment.
Figure 15:
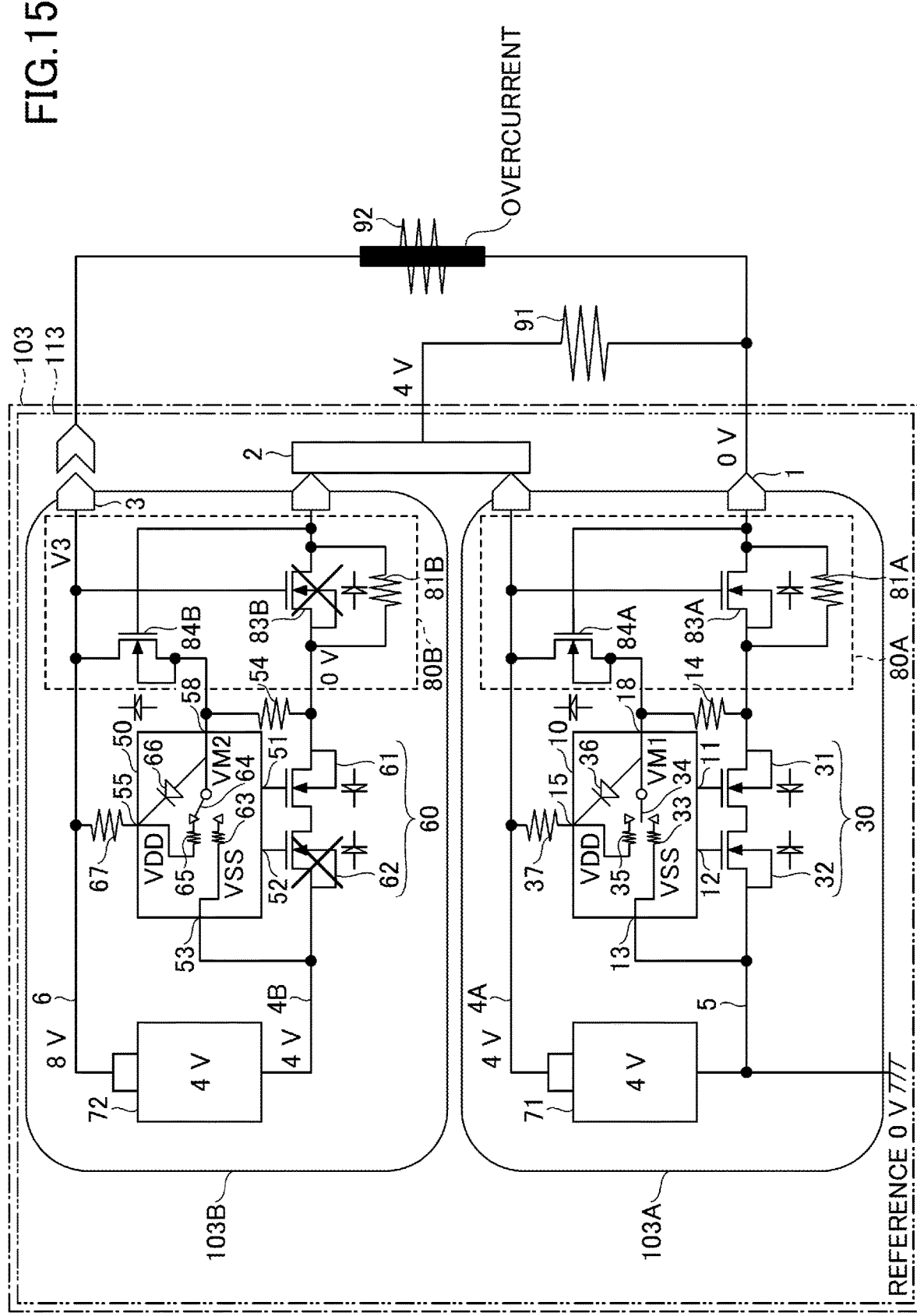
FIG. 15 is a diagram illustrating an example of detecting discharge overcurrent by a high side protection IC in the battery pack according to the third embodiment.

FIG. 14 is a diagram illustrating an example of a manner in which discharge overcurrent is detected by a low side protection IC in a battery pack 103 according to a third embodiment. FIG. 15 is a diagram illustrating an example of detecting discharge overcurrent by a high side protection IC in the battery pack 103 according to the third embodiment. Note that in the third embodiment, explanation will be omitted or be simplified for the same configuration and effect as those described in the embodiments.

As illustrated in FIG. 14, a battery pack 103 includes a first secondary battery 71 and a second secondary battery 72 that are series-connected, and includes a secondary-battery protection circuit 113 that protects each of the first secondary battery 71 and the second secondary battery 72.

A secondary-battery protection circuit 113 includes a first terminal 1, a second terminal 2, a third terminal 3, a first battery pack unit 103A, and a second battery pack unit 103B. The first battery pack unit 103A includes a first switching circuit 30 and a first protection IC 10. The second battery pack unit 103B includes a second switching circuit 60 and a second protection IC 50.

In a first current path 5 between a negative electrode of the first cell 71 and the first terminal 1, the first switching circuit 30 is inserted. A positive electrode of the first cell 71 is connected to the second terminal 2, via a second current path 4A. In a second current path 4B between a negative electrode of the second cell 72 and the second terminal 2, a second switching circuit 60 is inserted. A positive electrode of the second cell 72 is connected to the third terminal 3, via a third current path 6.

For example, the first switching circuit 30 includes a charge control transistor 31 that is a switch and of which a gate is connected to a charge control terminal 11 (COUT terminal), and includes a discharge control transistor 32 that is a switch and of which a gate is connected to a discharge control terminal 12 (DOUT terminal). The discharge control transistor 32 is an example of a first switch disposed in a discharge path.

For example, the second switching circuit 60 includes a charge control transistor 61 that is a switch and of which a gate is connected to a charge control terminal 51 (COUT terminal), and includes a discharge control transistor 62 that is a switch and of which a gate is connected to a discharge control terminal 52 (DOUT terminal). The discharge control transistor 62 is an example of a second switch disposed in a discharge path.

The first protection IC 10 includes a first monitor terminal 18 (VM1 terminal), which is connected, via a resistor 14, to the first current path 5 between the first terminal 1 and the first switching circuit 30, and includes a first power supply terminal 15 (VDD terminal) that is connected to a positive electrode of the first cell 71, via a resistor 37. The first protection IC 10 also includes a charge control terminal 11 (COUT terminal), a discharge control terminal 12 (DOUT terminal), and a ground terminal 13 (VSS terminal). The first protection IC 10 further includes a first protection element 36 that configures an internal current path between the first monitor terminal 18 and the first power supply terminal 15. The first protection IC 10 or the first battery pack unit 103A is an example of a first protection circuit that includes a first switch disposed in a discharge path, the first protection circuit being configured to protect a first secondary battery against overdischarge or discharge overcurrent, through the first switch.

A second protection IC 50 includes a second monitor terminal 58 (VM2 terminal), which is connected, via a resistor 54, to a second current path 4B between the second terminal 2 and the second switching circuit 60, and includes a second power supply terminal 55 (VDD terminal) that is connected to a positive electrode of the second cell 72, via a resistor 67. The second protection IC 50 also includes a charge control terminal 51 (COUT terminal), a discharge control terminal 52 (DOUT terminal), and a ground terminal 53 (VSS terminal). The second protection IC 50 further includes a second protection element 66 that configures an internal current path between the second monitor terminal 58 and the second power supply terminal 55. The second protection IC 50 or the second battery pack unit 103B is an example of a second protection circuit that includes a second switch disposed in a discharge path, the second protection circuit being configured to protect a second secondary battery against overdischarge or discharge overcurrent, through the second switch.

When detecting an off state of the first switching circuit 30, an off-state detecting circuit 80A fixes a potential at the first monitor terminal 18 to interrupt a current flowing into the first protection element 36. The off-state detecting circuit 80A includes a switch 83A, a switch 84A, and a resistor 81A. Each of the switches 83A and 84A is an NMOS transistor, for example.

When detecting an off state of the second switching circuit 60, an off-state detecting circuit 80B fixes a potential at the second monitor terminal 58 to interrupt a current flowing into the second protection element 66. The off-state detecting circuit 80B includes a switch 83B, a switch 84B, and a resistor 81B. Each of the switches 83B and 84B is an NMOS transistor, for example.

The off-state detecting circuits 80A and 80B each have the same function as the off-state detecting circuit 80 described in the first embodiment. In other words, when an off-state of the first switching circuit 30 is detected, the off-state detecting circuit 80A interrupts the current flowing into the first protection element 36. When an off-state of the second switching circuit 60 is detected, the off-state detecting circuit 80B interrupts the current flowing into the second protection element 66. The off-state detecting circuits 80A and 80B each have the same configuration as the above off-state detecting circuits 80, except that there is a difference between an NMOS transistor and a PMOS transistor; accordingly, detailed explanations for each of the off-state detecting circuits 80A and 80B will be omitted.

Fourth Embodiment

Figure 16:
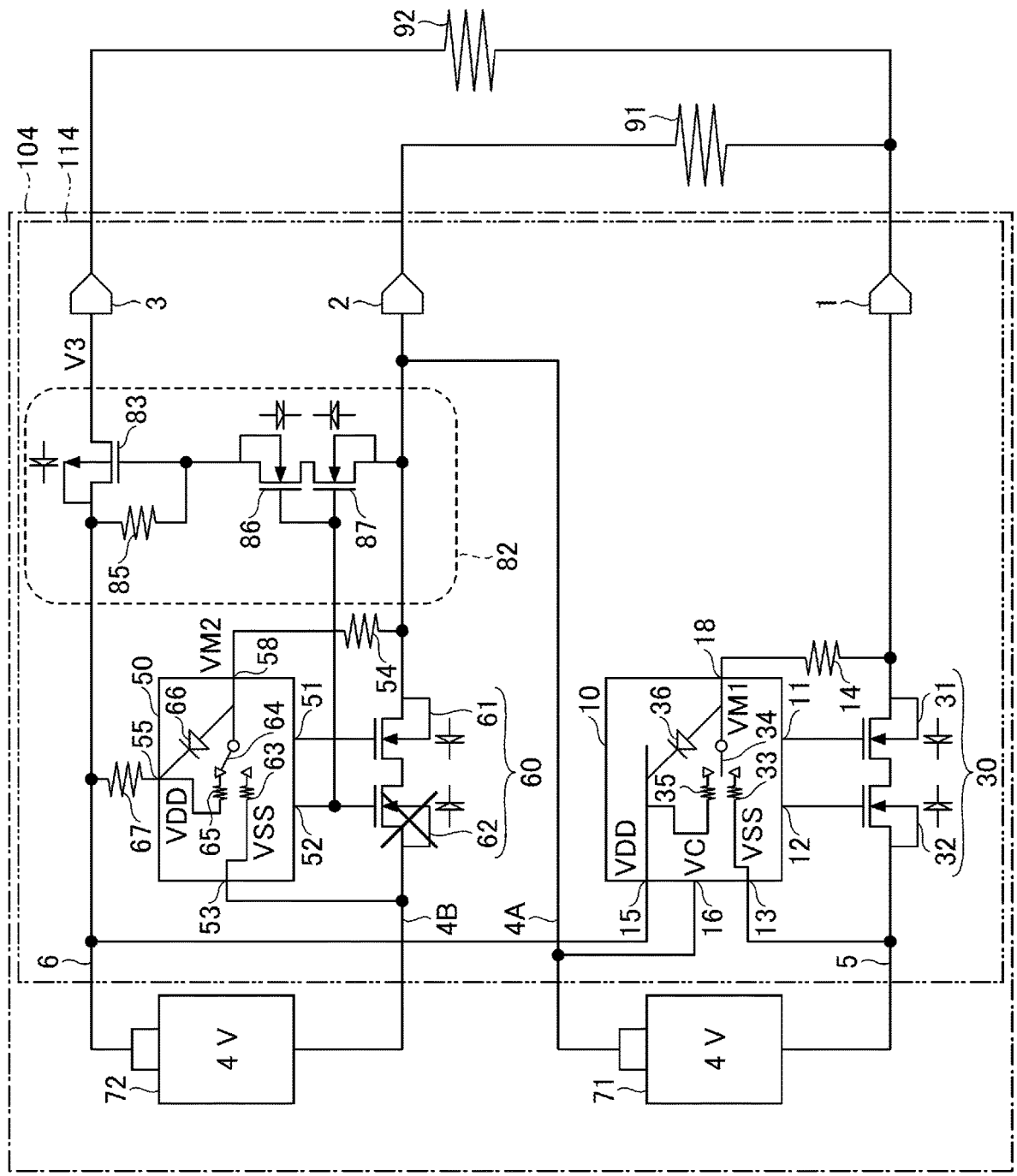
FIG. 16 is a diagram illustrating an example of detecting discharge overcurrent by a high side protection IC in a battery pack according to a fourth embodiment.
Figure 17:
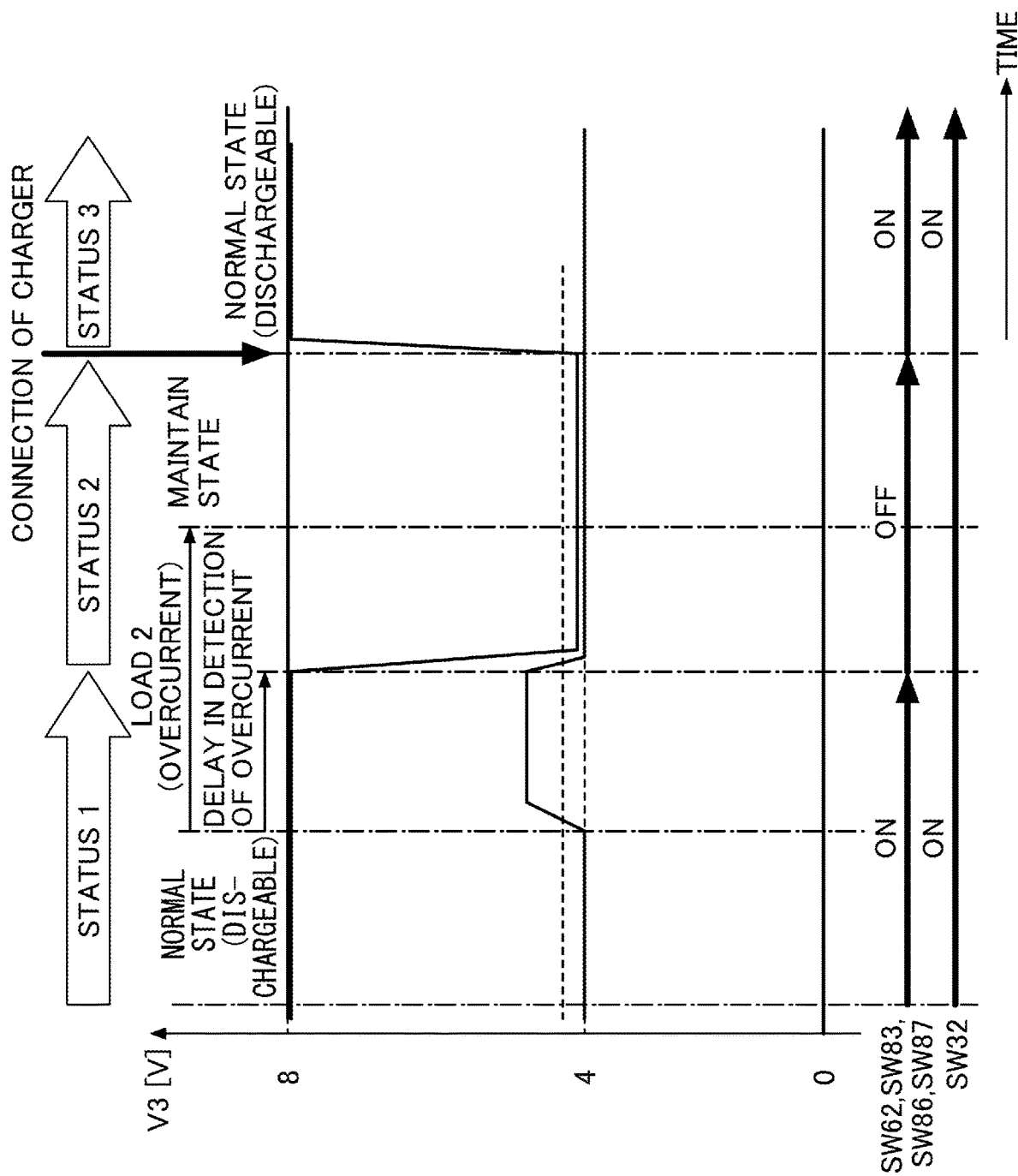
FIG. 17 is a timing chart illustrating an example of a manner before and after detecting discharge overcurrent by a high side protection IC in the battery pack according to the fourth embodiment.

FIG. 16 is a diagram illustrating an example of detecting discharge overcurrent by a high side protection IC in a battery pack 104 according to a fourth embodiment. FIG. 17 is a timing chart illustrating an example of a manner before and after detecting discharge overcurrent by a high side protection IC in the battery pack 104 according to the fourth embodiment. Note that in the fourth embodiment, explanation will be omitted or be simplified for the same configuration and effect that have been described in the embodiments.

In order to return from a protection state transitioned in response to detecting overcurrent, there are the following manners: a load-release return manner of returning from a protection state when a load is released; and a charger-connection return manner of returning from a protection state when a charger is connected. The fourth embodiment will be described using a charger-connection return manner.

As illustrated in FIG. 16, a battery pack 104 includes a first secondary battery 71 and a second secondary battery 72 that are series-connected, and includes a secondary-battery protection circuit 114 that protects each of the first secondary battery 71 and the second secondary battery 72.

A first protection IC 10 includes a first monitor terminal 18 (VM1 terminal), which is connected, via a resistor 14, to a first current path 5 between a first terminal 1 and a first switching circuit 30, and includes a first power supply terminal 15 (VDD terminal) that is connected to a positive electrode of the second cell 72. The first protection IC 10 also includes a charge control terminal 11 (COUT terminal), a discharge control terminal 12 (DOUT terminal), a cell voltage input terminal 16 (VC terminal), and a ground terminal 13 (VSS terminal). The first protection IC 10 further includes a first protection element 36 that configures an internal current path between the first monitor terminal 18 and the first power supply terminal 15.

A second protection IC 50 includes a second monitor terminal 58 (VM2 terminal), which is connected, via a resistor 54, to a second current path 4B between a second terminal 2 and a second switching circuit 60, and includes a second power supply terminal 55 (VDD terminal) that is connected to a positive electrode of the second cell 72, via a resistor 67. The second protection IC 50 also includes a charge control terminal 51 (COUT terminal), a discharge control terminal 52 (DOUT terminal), and a ground terminal 53 (VSS terminal). The second protection IC 50 further includes a second protection element 66 that configures an internal current path between the second monitor terminal 58 and the second power supply terminal 55.

When detecting overdischarge, the second protection IC 50 turns off the switches 86 and 87 and turns on the switch 83, in accordance with output of the discharge control terminal 52, to interrupt a current flowing into the second protection element 66. The off-state detecting circuit 82 maintains a state of interrupting the current flowing into the second protection element 66, until a charger is connected to the first terminal 1 and a third terminal 3. The off-state detecting circuit 82 includes switches 83, 86, and 87 and a resistor 85. A PMOS transistor is an example of the switch 83. An NMOS transistor is an example of each of the switches 86 and 87.

The switch 83 is inserted in a third current path 6. The resistor 85 is connected between a gate and a source of the switch 83. The switches 86 and 87 are connected in series, and gates of the switches 86 and 87 are commonly connected to the discharge control terminal 52. A source of the switch 86 is connected to the gate of the switch 83, and a source of the switch 87 is connected to the second terminal 2.

In the fourth embodiment, with respect to the second protection IC 50, when discharge overcurrent flowing into a first load 91 is detected, a switch 64 operates and a VM2 terminal is connected to the VDD terminal 55 via a resistor 65, such that a potential at the VM2 terminal increases. Thereby, a second protection state is maintained, even when a first load 91 is released. In order to return to a normal state, by connecting a charger, a potential at the VM2 terminal is decreased to a level corresponding to a potential at the VSS terminal 53. As a result, a second protection state can be returned to a normal state.

As described above, the secondary-battery protection circuit and the battery pack have been described. The present disclosure is not limited to the embodiments described above. Various changes and modifications, such as combinations and substitutions of some or all of the embodiments, can be made within the scope of the present disclosure.

For example, in the example of each of FIGS. 14 and 16, a first switching circuit 30 may be inserted in a second current path 4A between a positive electrode of a first secondary battery 71 and a second terminal 2. In the example of each of FIGS. 14 and 16, a second switching circuit 60 may be inserted in a third current path 6 between a positive electrode of a second secondary battery 72 and a third terminal 3.

Figure 18:
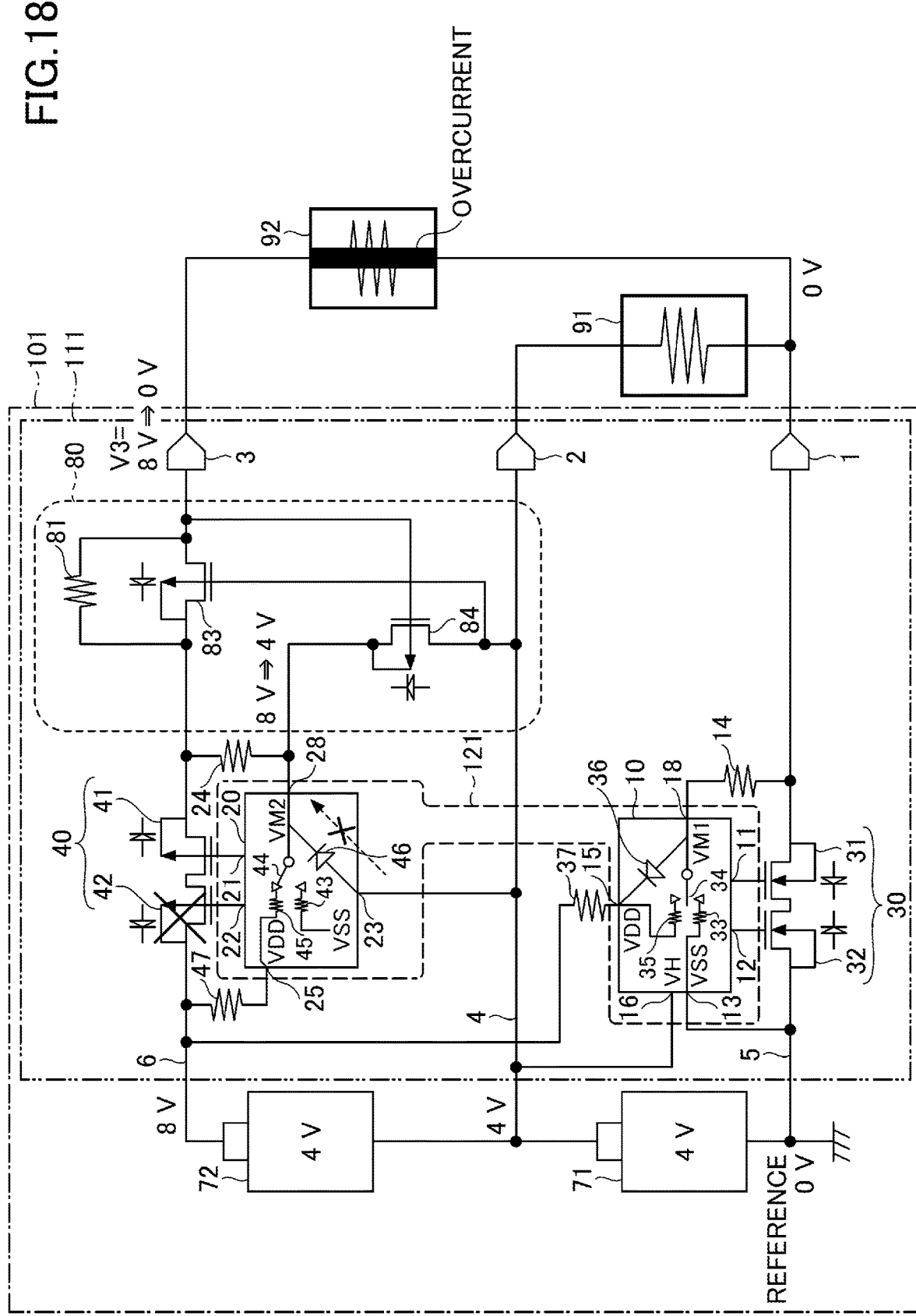
FIG. 18 is a diagram illustrating an example of a battery pack in a first modification of the first embodiment.

FIG. 18 is a diagram illustrating an example of a battery pack in a first modification of the first embodiment. A secondary-battery protection circuit 111 includes a complex integrated circuit 121 that incorporates (combines) a first protection IC 10 and a second protection IC 20. The complex integrated circuit 121 is a multi-chip package in which the first protection IC 10 and the second protection IC 20 are integrated in one package. By placing two components in one package, ease of mounting of a given board is improved as well as reductions of a mounted area. In the complex integrated circuit 121, at least one of: a combination of the first protection IC 10 and the first switching circuit 30; and a combination of a second protection IC 20 and a second switching circuit 40, may be integrated.

Figure 19:
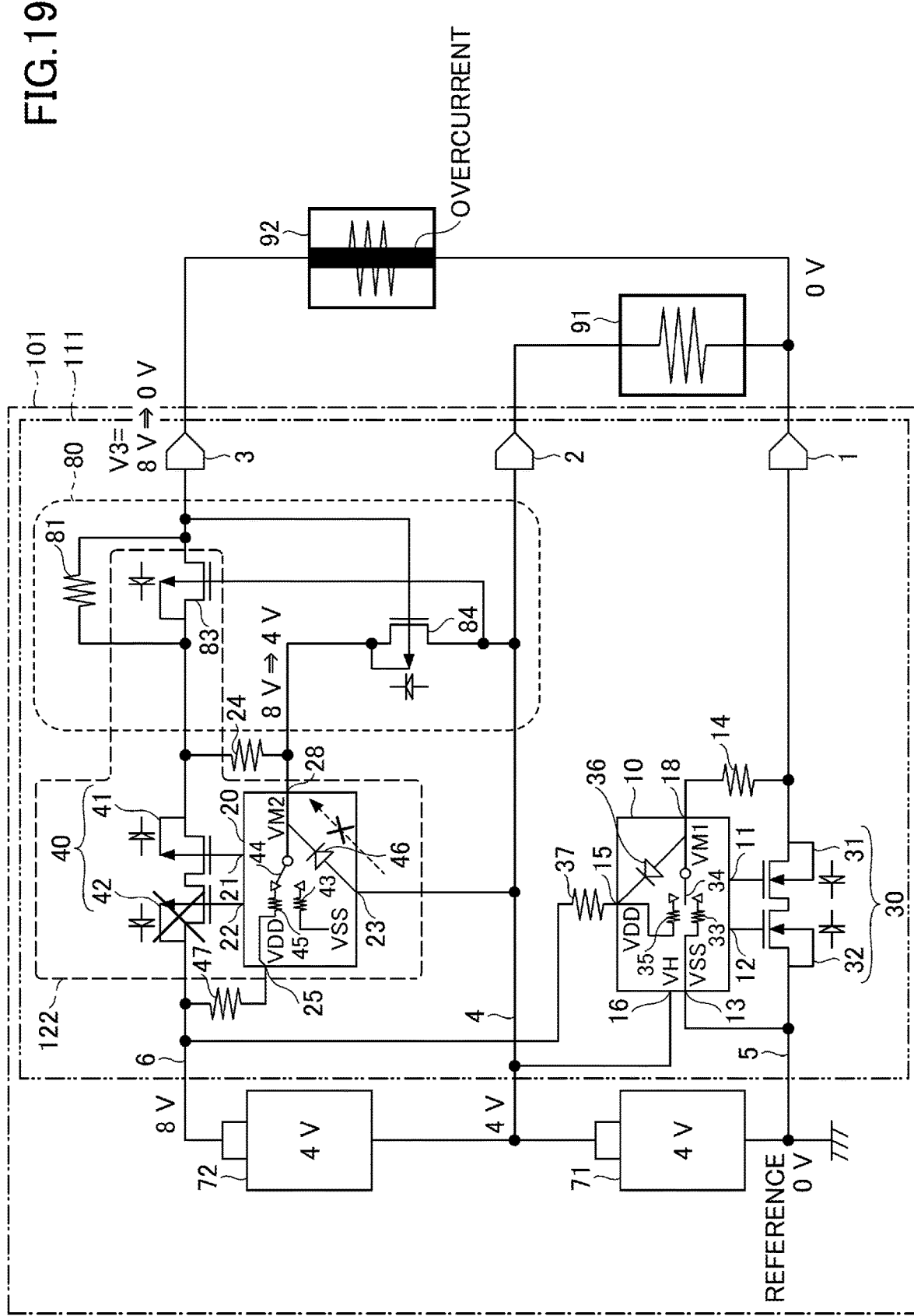
FIG. 19 is a diagram illustrating an example of a battery pack in a second modification of the first embodiment.

FIG. 19 is a diagram illustrating an example of a battery pack in a second modification of the first embodiment. A secondary-battery protection circuit 111 includes a complex integrated circuit 122 that incorporates (combines) a second protection IC 20, a second switching circuit 40, and a switch 83. The complex integrated circuit 122 is a multi-chip package in which the second protection IC 20, the second switching circuit 40, and the switch 83 are integrated in one package. By placing three components in one package, ease of mounting of a given board is improved as well as reductions of a mounted area.

Figure 20:
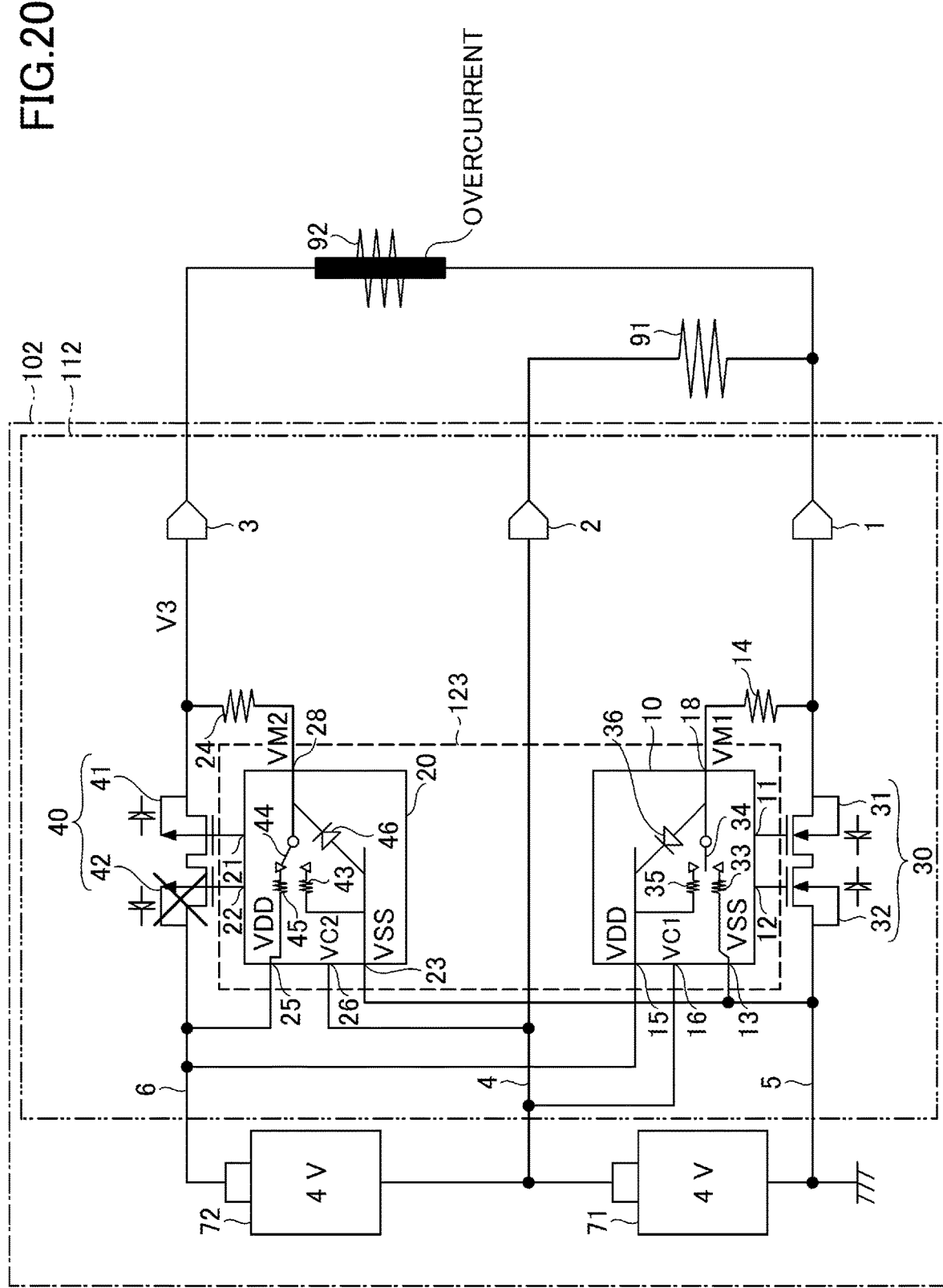
FIG. 20 is a diagram illustrating an example of a battery pack in a first modification of the second embodiment.

FIG. 20 is a diagram illustrating an example of a battery pack in a first modification of the second embodiment. A secondary-battery protection circuit 112 includes a complex integrated circuit 123 that incorporates (combines) a first protection IC 10 and a second protection IC 20. The complex integrated circuit 123 is a multi-chip package in which the first protection IC 10 and the second protection IC 20 are integrated in one package. By placing two components in one package, ease of mounting of a given board is improved as well as reductions of a mounted area. In the complex integrated circuit 123, at least one of: a combination of the first protection IC 10 and the first switching circuit 30; and a combination of a second protection IC 20 and a second switching circuit 40, may be integrated.

In each embodiment, at least one of a charge control transistor 31 and a discharge control transistor 32 may be integrated into a chip on which a first protection IC 10 is disposed. Similarly, at least one of a charge control transistor 41 and a discharge control transistor 42 may be integrated into a chip on which a second protection IC 20 is disposed. Similarly, at least one of a charge control transistor 61 and a discharge control transistor 62 may be integrated into a chip on which a second protection IC 50 is disposed.

What is claimed is:

1. A secondary-battery protection circuit for protecting each of series-connected first secondary battery and second secondary battery, the secondary-battery protection circuit comprising:
   a first terminal;
   a second terminal;
   a third terminal;
   a first switching circuit configured to be disposed in a current path between a negative electrode of the first secondary battery and the first terminal, or in a current path between a positive electrode of the first secondary battery and the second terminal;
   a second switching circuit configured to be disposed in a current path between a negative electrode of the second secondary battery and the second terminal or in a current path between a positive electrode of the second secondary battery and the third terminal;
   a first protection IC configured to turn off the first switching circuit to protect the first secondary battery against overdischarge or discharge overcurrent;
   a second protection IC configured to turn off the second switching circuit to protect the second secondary battery against overdischarge or discharge overcurrent,
   wherein the secondary-battery protection circuit is configured to:
   in response to detecting that the first switching circuit is turned on by the first protection IC and the second switching circuit is turned on by the second protection IC,
      supply a first output voltage to a first load between the first terminal and the second terminal, the first output voltage corresponding to a voltage across the first secondary battery; and
      supply a third output voltage to a second load between the first terminal and the third terminal, the third output voltage indicating the sum of the first output voltage and a second output voltage, the second output voltage corresponding to a voltage across the second secondary battery; and
   in response to detecting that the first switching circuit is turned off by the first protection IC and the second switching circuit is turned on by the second protection IC,
      stop supplying the first output voltage to the first load; and
      stop supplying the third output voltage via the first terminal and the third terminal; and
   in response to detecting that the first switching circuit is turned on by the first protection IC and the second switching circuit is turned off by the second protection IC,
      supply the first output voltage to the first load; and
      stop supplying the third output voltage via the first terminal and the third terminal.

2. The secondary-battery protection circuit according to claim 1, further comprising an off-state detecting circuit configured to detect an off state of at least one of the first switching circuit and the second switching circuit.

3. The secondary-battery protection circuit according to claim 2, wherein the first switching circuit is disposed in the current path being a first current path between the negative electrode of the first secondary battery and the first terminal, wherein the second switching circuit is disposed in the current path being a second path between the negative electrode of the second secondary battery and the second terminal, wherein the first protection IC includes a first monitor terminal, a first power supply terminal, and a first protection element, the first monitor terminal being electrically connected, via a resistor, to the first current path between the first terminal and the first switching circuit, the first power supply terminal being configured to be electrically connected to the positive electrode of the first secondary battery, and the first protection element including an internal current path between the first monitor terminal and the first power supply terminal,
wherein the second protection IC includes a second monitor terminal, a second power supply terminal, and a second protection element, the second monitor terminal being electrically connected, via a resistor, to the second current path between the second terminal and the second switching circuit, the second power supply terminal being configured to be electrically connected to the positive electrode of the second secondary battery, and the second protection element including an internal current path between the second monitor terminal and the second power supply terminal, and wherein the off-state detecting circuit is configured to:
  interrupt a current flowing into the first protection element in response to detecting an off state of the first switching circuit; and
  interrupt a current flowing into the second protection element in response to detecting an off state of the second switching circuit.

4. The secondary-battery protection circuit according to claim 3, wherein the off-state detecting circuit is configured to:
  in response to detecting the off state of the first switching circuit, fix a potential at the first monitor terminal to interrupt the current flowing into the first protection element, and
  in response to detecting the off state of the second switching circuit, fix a potential at the second monitor terminal to interrupt the current flowing into the second protection element.

5. The secondary-battery protection circuit according to claim 2, wherein the first switching circuit is disposed in the current path being a first current path between the negative electrode of the first secondary battery and the first terminal,
  wherein the second switching circuit is disposed in the current path being a third path between the positive electrode of the second secondary battery and the third terminal,
  wherein the first protection IC includes a first monitor terminal, a first power supply terminal, and a first protection element, the first monitor terminal being electrically connected, via a resistor, to the first current path between the first terminal and the first switching circuit, the first power supply terminal being configured to be electrically connected to the positive electrode of the second secondary battery, and the first protection element including an internal current path between the first monitor terminal and the first power supply terminal,
  wherein the second protection IC includes a second monitor terminal, a ground terminal, and a second protection element, the second monitor terminal being electrically connected, via a resistor, to the third current path between the third terminal and the second switching circuit, the ground terminal being configured to be electrically connected to the negative electrode of the second secondary battery, and the second protection element including an internal current path between the ground terminal and the second monitor terminal, and
  wherein the off-state detecting circuit is configured to interrupt a current flowing into the second protection element in response to detecting an off state of the second switching circuit.

6. The secondary-battery protection circuit according to claim 5, wherein the off-state detecting circuit is configured to, in response to detecting the off state of the second switching circuit, fix a potential at the second monitor terminal to interrupt the current flowing into the second protection element.

7. The secondary-battery protection circuit according to claim 2, wherein the first switching circuit is disposed in the current path being a first current path between the negative electrode of the first secondary battery and the first terminal,
  wherein the second switching circuit is disposed in the current path being a second path between the negative electrode of the second secondary battery and the second terminal,
  wherein the first protection IC includes a first monitor terminal, a first power supply terminal, and a first protection element, the first monitor terminal being electrically connected, via a resistor, to the first current path between the first terminal and the first switching circuit, the first power supply terminal being configured to be electrically connected to the positive electrode of the second secondary battery, and the first protection element including an internal current path between the first monitor terminal and the first power supply terminal,
  wherein the second protection IC includes a second monitor terminal, a second power supply terminal, and a second protection element, the second monitor terminal being electrically connected, via a resistor, to the second current path between the second terminal and the second switching circuit, the second power supply terminal being configured to be electrically connected to the positive electrode of the second secondary battery, and the second protection element including an internal current path between the second monitor terminal and the second power supply terminal, and
  wherein the off-state detecting circuit is configured to interrupt a current flowing into the second protection element in response to detecting an off state of the second switching circuit.

8. The secondary-battery protection circuit according to claim 7, wherein the off-state detecting circuit is configured to, in response to detecting the off state of the second switching circuit, fix a potential at the second monitor terminal to interrupt the current flowing into the second protection element.

9. The secondary-battery protection circuit according to claim 8, wherein the off-state detecting circuit is configured to maintain a state of interrupting the current flowing into the second protection element, until a charger is electrically coupled to the first terminal and third terminal.

10. The secondary-battery protection circuit according to claim 1, wherein the first switching circuit is disposed in the current path being a first current path between the negative electrode of the first secondary battery and the first terminal,
  wherein the second switching circuit is disposed in the current path being a third current path between the positive electrode of the second secondary battery and the third terminal,
  wherein the first protection IC includes a first monitor terminal, a first power supply terminal, and a first protection element, the first monitor terminal being electrically connected, via a resistor, to the first current path between the first terminal and the first switching circuit, the first power supply terminal being configured to be electrically connected to the positive electrode of the second secondary battery, and the first protection element including an internal current path between the first monitor terminal and the first power supply terminal, and
  wherein the second protection IC includes a second monitor terminal, a ground terminal, and a second protection element, the second monitor terminal being electrically connected, via a resistor, to the third current path between the third terminal and the second switching circuit, the ground terminal being configured to be electrically connected to the negative electrode of the second secondary battery, and the second protection element including an internal current path between the ground terminal and the second monitor terminal.

11. The secondary-battery protection circuit according to claim 1, wherein the first protection IC and the second protection IC are integrated as a chip.

12. The secondary-battery protection circuit according to claim 1, wherein at least one among from a combination of the first protection IC and the first switching circuit; and a combination of the second protection IC and the second switching circuit is integrated as a chip.

13. A secondary-battery protection circuit comprising:
a first output terminal configured to be electrically connected to a negative electrode of a first secondary battery that is electrically connected to a second secondary battery in series;
a second output terminal configured to be electrically connected to a positive electrode of the first secondary battery and a negative electrode of the second secondary battery;
a third output terminal configured to be electrically connected to a positive electrode of the second secondary battery;
a first protection circuit includes a first switch in a discharge path, the first protection circuit being configured to protect the first secondary battery against overdischarge or discharge overcurrent, through the first switch;
a second protection circuit includes a second switch in a discharge path, the second protection circuit being configured to protect the second secondary battery against overdischarge or discharge overcurrent, through the second switch,
wherein the secondary-battery protection circuit is configured to:
supply a voltage across each of the first secondary battery and the second secondary battery;
supply the sum of a voltage across the first secondary battery and a voltage across the second secondary battery;
in response to detecting that the first switch is turned off by the first protection circuit and the second switch is turned on by the second protection circuit, interrupt a current flow to a first load between the first output terminal and the second output terminal; and
in response to detecting that the second switch is turned off by the second protection circuit and the first switch is turned on by the first protection circuit, interrupt a current flow to a second load between the first output terminal and the third output terminal.

14. The secondary-battery protection circuit according to claim 13, wherein the first protection circuit and the second protection circuit are integrated as a chip.

15. The secondary-battery protection circuit according to claim 13, wherein at least one among from a combination of the first protection circuit and the first switch; and a combination of the second protection circuit and the second switch is integrated as a chip.

16. A battery pack comprising:
a first secondary battery;
a second secondary battery being electrically connected to the first secondary battery in series;
a secondary-battery protection circuit including:
a first terminal;
a second terminal;
a third terminal;
a first switching circuit in a current path between a negative electrode of the first secondary battery and the first terminal, or in a current path between a positive electrode of the first second secondary battery and the second terminal;
a second switching circuit in a current path between a negative electrode of the second secondary battery and the second terminal; or in a current path between a positive electrode of the second secondary battery and the third terminal;
a first protection IC configured to turn off the first switching circuit to protect the first secondary battery against overdischarge or discharge overcurrent;
a second protection IC configured to turn off the second switching circuit to protect the second secondary battery against overdischarge or discharge overcurrent,
wherein the secondary-battery protection circuit is configured to:
in response to detecting that the first switching circuit is turned on by the first protection IC and the second switching circuit is turned on by the second protection IC,
supply a first output voltage to a first load between the first terminal and the second terminal, the first output voltage corresponding to a voltage across the first secondary battery; and
supply a third output voltage to a second load between the first terminal and the third terminal, the third output voltage indicating the sum of the first output voltage and a second output voltage, the second output voltage corresponding to a voltage across the second secondary battery; and
in response to detecting that the first switching circuit is turned off by the first protection IC and the second switching circuit is turned on by the second protection IC,
stop supplying the first output voltage to the first load; and
stop supplying the third output voltage via the first terminal and the third terminal; and
in response to detecting that the first switching circuit is turned on by the first protection IC and the second switching circuit is turned off by the second protection IC,
supply the first output voltage to the first load; and
stop supplying the third output voltage via the first terminal and the third terminal.

* * * * *